United States Patent
Taylor et al.

(10) Patent No.: US 8,011,914 B2
(45) Date of Patent: Sep. 6, 2011

(54) FOOD SUPPLY SYSTEM FOR A FOOD PATTY MOLDING MACHINE

(75) Inventors: Paul Taylor, Munster, IN (US); Glenn Sandberg, New Lenox, IL (US); Scott A. Lindee, Mokena, IL (US)

(73) Assignee: Formax, Inc., Mokena, IL (US)

( * ) Notice: Subject to any disclaimer, the term of this patent is extended or adjusted under 35 U.S.C. 154(b) by 529 days.

(21) Appl. No.: 12/018,778

(22) Filed: Jan. 23, 2008

(65) Prior Publication Data

US 2008/0230351 A1 Sep. 25, 2008

Related U.S. Application Data

(60) Provisional application No. 60/881,887, filed on Jan. 23, 2007.

(51) Int. Cl.
*B29C 47/92* (2006.01)
*B28B 17/00* (2006.01)

(52) U.S. Cl. .............. 425/145; 425/185; 425/192 R; 425/587

(58) Field of Classification Search .......... 425/145, 425/185, 192 R, 572, 587; 426/512
See application file for complete search history.

(56) References Cited

U.S. PATENT DOCUMENTS

| | | | |
|---|---|---|---|
| 410,412 A | 9/1889 | Groshon | |
| 3,773,166 A * | 11/1973 | Nowacki | 198/493 |
| 3,887,964 A | 6/1975 | Richards et al. | |
| 4,258,066 A * | 3/1981 | Bernard | 426/231 |
| 4,356,595 A | 11/1982 | Sandberg et al. | |
| 4,372,008 A | 2/1983 | Sandberg | |
| 4,821,376 A | 4/1989 | Sandberg | |
| 4,846,652 A * | 7/1989 | Hehl | 425/190 |
| 4,996,743 A | 3/1991 | Janssen | |
| 5,281,429 A * | 1/1994 | Zevlakis | 426/389 |
| 7,159,372 B2 | 1/2007 | Lindee | |
| 7,255,554 B2 | 8/2007 | Lamartino | |
| 7,591,644 B2 | 9/2009 | Sandberg et al. | |
| 2005/0074515 A1* | 4/2005 | Hansen et al. | 425/557 |
| 2006/0222727 A1* | 10/2006 | Iwata et al. | 425/208 |

OTHER PUBLICATIONS

Drawings of feed screw assemblies from versions of F24 and F26 patty forming machines on sale for more than one year before earliest filing date of present application.

* cited by examiner

*Primary Examiner* — Maria Veronica D Ewald
(74) *Attorney, Agent, or Firm* — Erickson Law Group, PC

(57) ABSTRACT

A patty-forming machine includes a food supply system where the drive mechanism for feed screws use integrated and compact motor and gearbox assemblies. The feed screws have heavy wall thickness flights and the feed screw shafts are journaled through modular bearing assemblies. A conveyor that forms the bottom of the hopper uses a sealed drum motor housed in the drive roller to drive the conveyor. A food supply system includes independent sensing means for indicating whenever the moldable food material accumulated at one end of the hopper exceeds a given level.

20 Claims, 38 Drawing Sheets

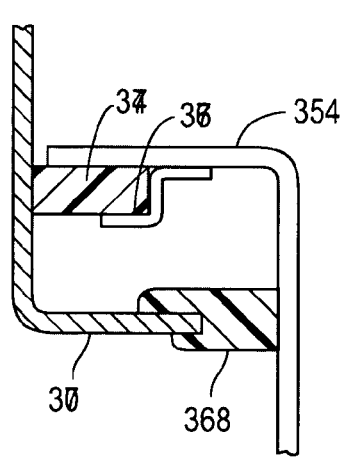
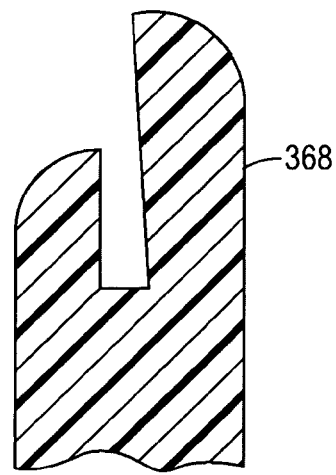
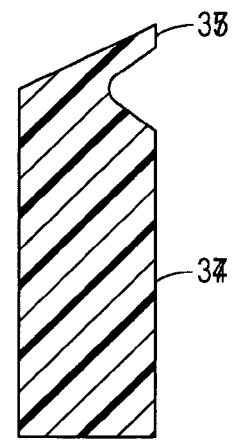
FIG. 21   FIG. 21A   FIG. 21B
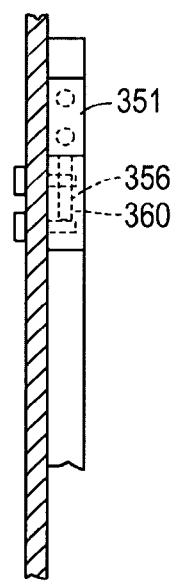
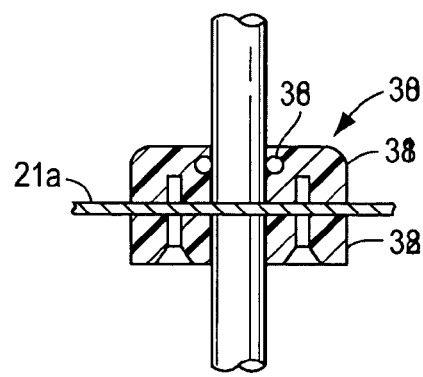
FIG. 22   FIG. 24

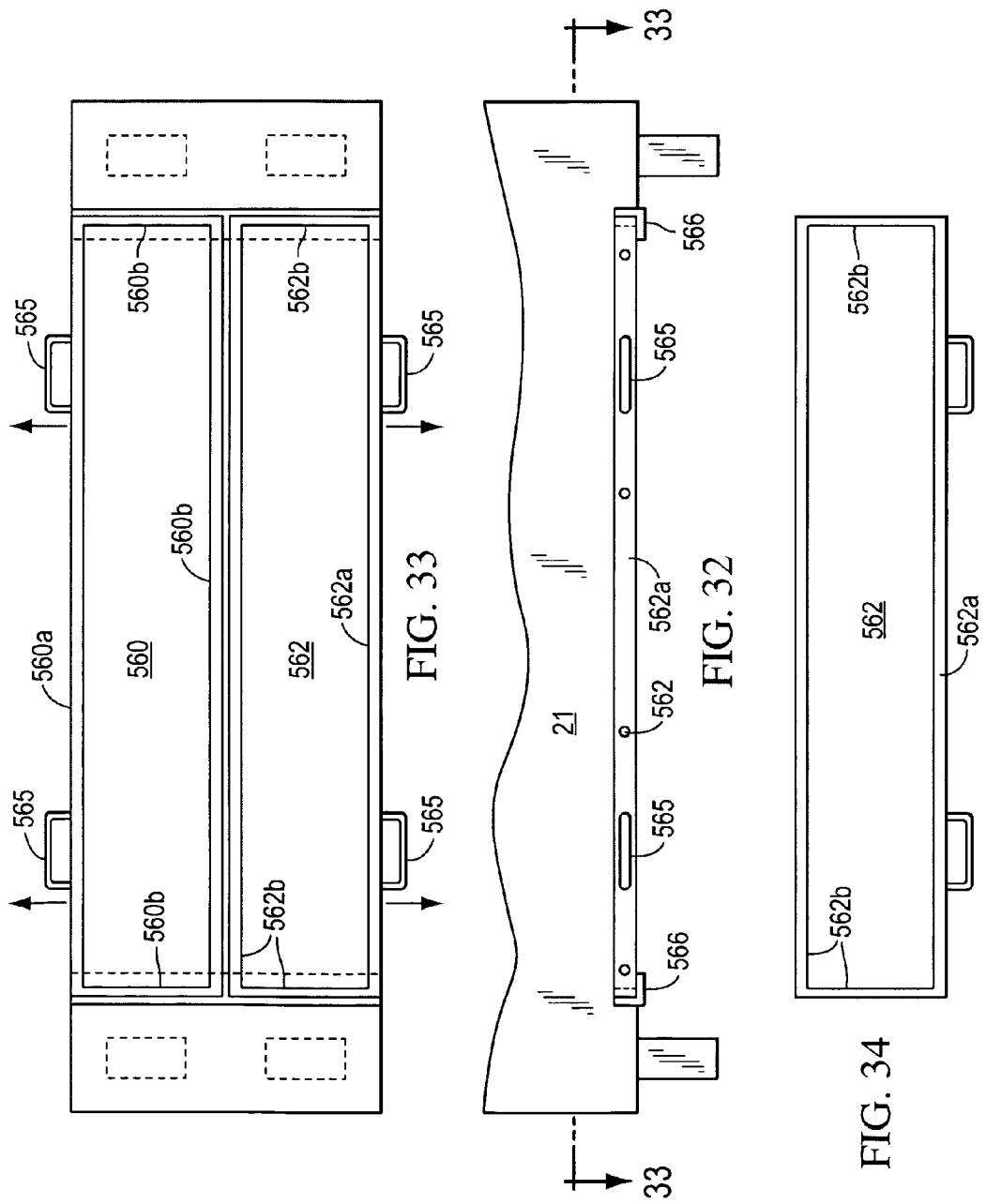

FOOD SUPPLY SYSTEM FOR A FOOD PATTY MOLDING MACHINE

This application claims the benefit of U.S. provisional patent application Ser. No. 60/881,887 filed on Jan. 23, 2007.

BACKGROUND OF THE INVENTION

Food processors utilize high-speed molding machines, such as FORMAX® MAXUM700®, F-6™, F-12™ F-19™, F-26™, or F400™ reciprocating mold plate forming machine, available from Formax, Inc. of Mokena, Ill., U.S.A., for supplying patties to the fast food industry. High-speed molding machines are also described for example in U.S. Pat. Nos. 3,887,964; 4,372,008; 4,356,595; 4,821,376; 4,996,743, and 7,255,554.

The FORMAX® F-26™ reciprocating mold plate forming machine has enjoyed widespread commercial success for over 35 years. A typical FORMAX® F-26™ molding machine can operate at 90 strokes per minute and produce about 32,400 patties per hour based on the standard width mold plate for the F-26™ which is about 27 inches wide and can include 6 mold cavities.

The FORMAX® F-26™ molding machine is generally described in U.S. Pat. Nos. 3,887,964; 4,356,595 and 4,996,743. The FORMAX® F-26™ includes a supply system for supplying a moldable food material, such as ground beef, fish, or the like, to the processing mechanisms of the machine. The supply system comprises a large food material storage hopper that opens into the intake of a food pump system. The food pump system includes at least two food pumps that continuously pump food, under pressure, into a manifold connected to a cyclically operable molding mechanism.

In the operation of a FORMAX® F-26™ patty-forming machine, a supply of ground meat or other moldable food material is dumped into the hopper from overhead. The floor of the hopper comprises a conveyor belt for moving the food material longitudinally of the hopper toward the other components of the food material supply system.

At the forward end of the hopper the food material is fed downwardly by the supply system into the intake of the reciprocating pumps constituting the pumping system. The pumps operate in overlapping alteration to each other; at any given time when the machine is in operation at least one of the pumps is forcing food material under pressure into the intake of the manifold.

The manifold comprises a valving system for feeding the food material, still under relatively high pressure, into the molding mechanism. The molding mechanism operates on a cyclic basis, first sliding a multi-cavity mold plate into receiving position over the manifold and then away from the manifold to a discharge position aligned with a series of knockout cups. When the mold plate is at its discharge position, the knockout cups are driven downwardly, discharging the hamburgers or other molded products from the machine.

The mold plate is connected to a pair of drive arms that extend alongside the housing and are each connected at one end to a swing link. The other end of each link is pivotally connected to one of a pair of rocker arms which, with a second arm, forms cranks pivoted on a fixed shaft. The free end of each crank arm is connected to a connecting rod assembly that includes a hydraulic shock absorber. The shock absorber is connected to a mold plate crank arm having a crank pin linked to the output shaft of a gear reducer. The gear reducer is driven through a variable speed drive actuated by a mold plate drive motor.

The molding mechanism further comprises a knockout apparatus. The knockout apparatus comprises the knockout cups, which are affixed to a carrier bar that is removably mounted upon a knockout support member. The knockout cups are coordinated in number and size to the mold cavities in the mold plate; there is one knockout cup aligned with each mold cavity and the mold cavity size is somewhat greater than the size of an individual knockout cup.

A knockout support member is carried by two knockout rods. Each knockout rod is disposed in an individual housing and is pivotally connected to its own knockout rocker arm.

Each knockout rocker arm is pivotally mounted upon a shaft. Two springs are connected to each knockout rocker arm, biasing the arm toward movement in a clockwise direction. Clockwise movement of each rocker arm is limited by a stop aligned with a bumper mounted in housing.

Each rocker arm is normally restrained against counterclockwise movement by engagement with a knockout cam; the two cams each have a notch aligned with the corresponding notch on the other cam. The cams are affixed to a knockout cam shaft. The shaft extends across the housing to a right angle drive connection leading to a vertical knockout cam drive shaft that has a driving connection to the mold plate drive gear reducer output shaft via a lower right angle drive.

Although the FORMAX® F-26™ patty-forming machine has achieved widespread acceptance in the industry, the present inventors have recognized the advantages of an improved patty-forming machine with more flexibility of operating control, an increased ease of and reliability of hygiene control, an increased smoothness and quietness of operation, and increased ease of, and reduced cost of, maintenance, an increased speed of operation, and an increased ruggedness of construction.

SUMMARY OF THE INVENTION

The invention provides a patty-forming machine with many improvements to the food supply system. One improvement is the use of integrated and compact motor and gearbox assemblies to drive the screw feeders. Further the food supply system comprises the use of modular bearing assembly on the shafts of the feed screws. The modular attachment of the bearing to the support plate allows the screw drive assemblies to be removed without removing the corresponding bearing assemblies. Also, the feed screws have heavy wall thickness flights of at least 0.24 inches.

Another improvement is the use of a sealed drum motor housed in the drive roller to drive the conveyor. In addition, the food supply system includes independent sensing means for indicating whenever the moldable food material accumulated at said one end of the hopper exceeds a given level.

The apparatus of the invention eliminates all sprockets, chains, spline shafts, universal joints, timing belts and pulleys of the current FORMAX® F-26™ patty-forming machine. The apparatus of the present invention is anticipated to achieve a speed of at least 100 strokes per minute.

The apparatus of the invention provides many other improvements that improve or enhance the hygiene, maintenance, manufacturing cost, operability of the FORMAX® F-26™ patty-forming machine.

Numerous other advantages and features of the present invention will be become readily apparent from the following detailed description of the invention and the embodiments thereof, and from the accompanying drawings.

BRIEF DESCRIPTION OF THE DRAWINGS

FIG. 21 is a fragmentary sectional view taken generally along lines 21-21 of FIG. 20;

FIG. 21A is a sectional view of a door frame seal element shown in FIG. 21;

FIG. 21B is a sectional view of a door seal element shown in FIG. 21;

FIG. 22 is a fragmentary sectional view taken generally along line 22-22 of FIG. 20;

FIG. 24 is an enlarged fragmentary sectional view taken generally along line 24-24 of FIG. 23;

FIG. 32 is an enlarged, fragmentary, diagrammatic right side elevation view of a portion of the machine shown in FIG. 1;

FIG. 33 is a diagrammatic sectional view taken generally along line 33-33 of FIG. 32; and FIG. 34 is a plan view of a floor panel removed from the patty-forming machine.

DESCRIPTION OF THE PREFERRED EMBODIMENT

Figure 1:
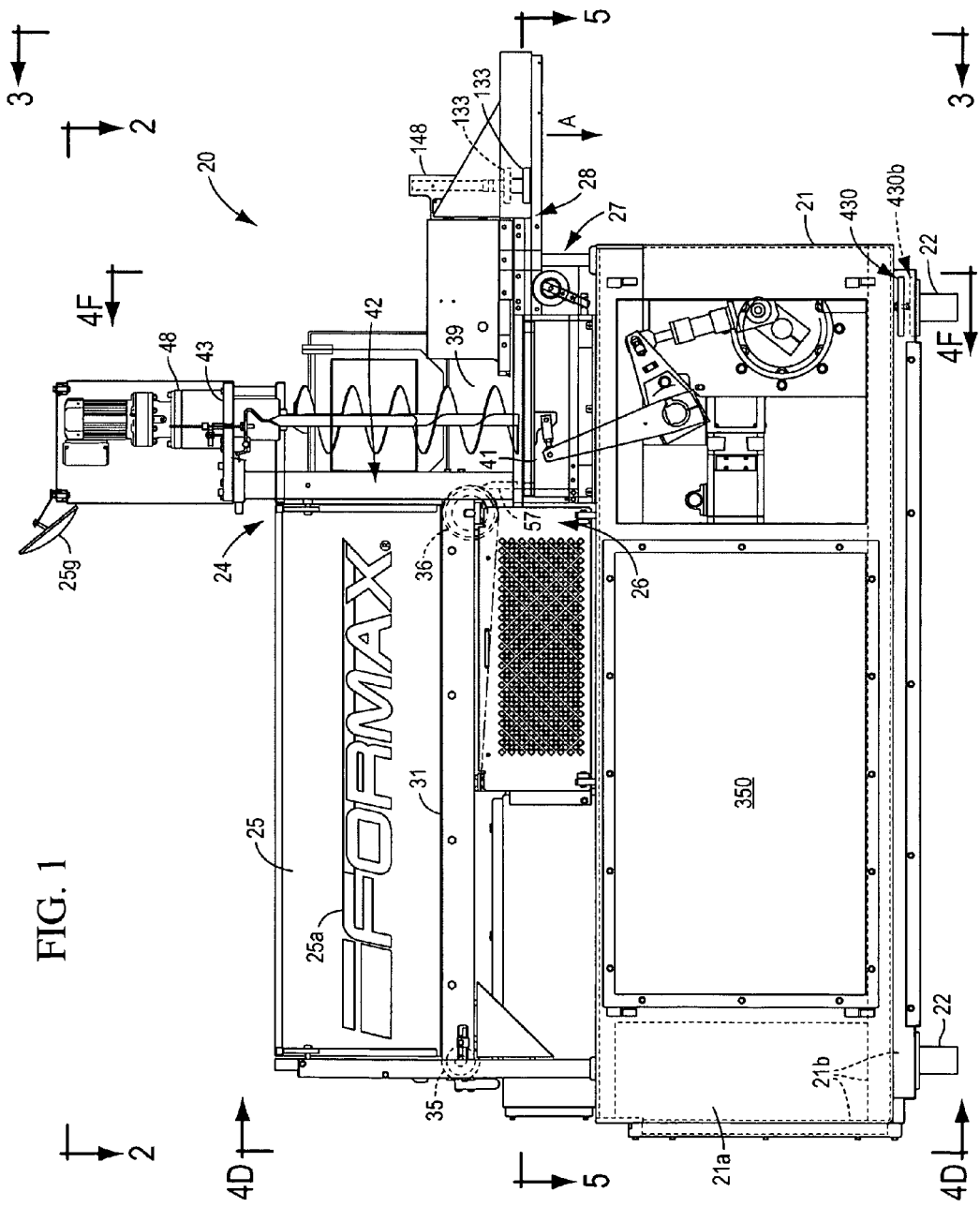
FIG. 1 is a right side elevation view of a high speed food patty molding machine constructed in accordance with a preferred embodiment of the present invention, with some panels and components shown transparent to illustrate underlying components.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 3:
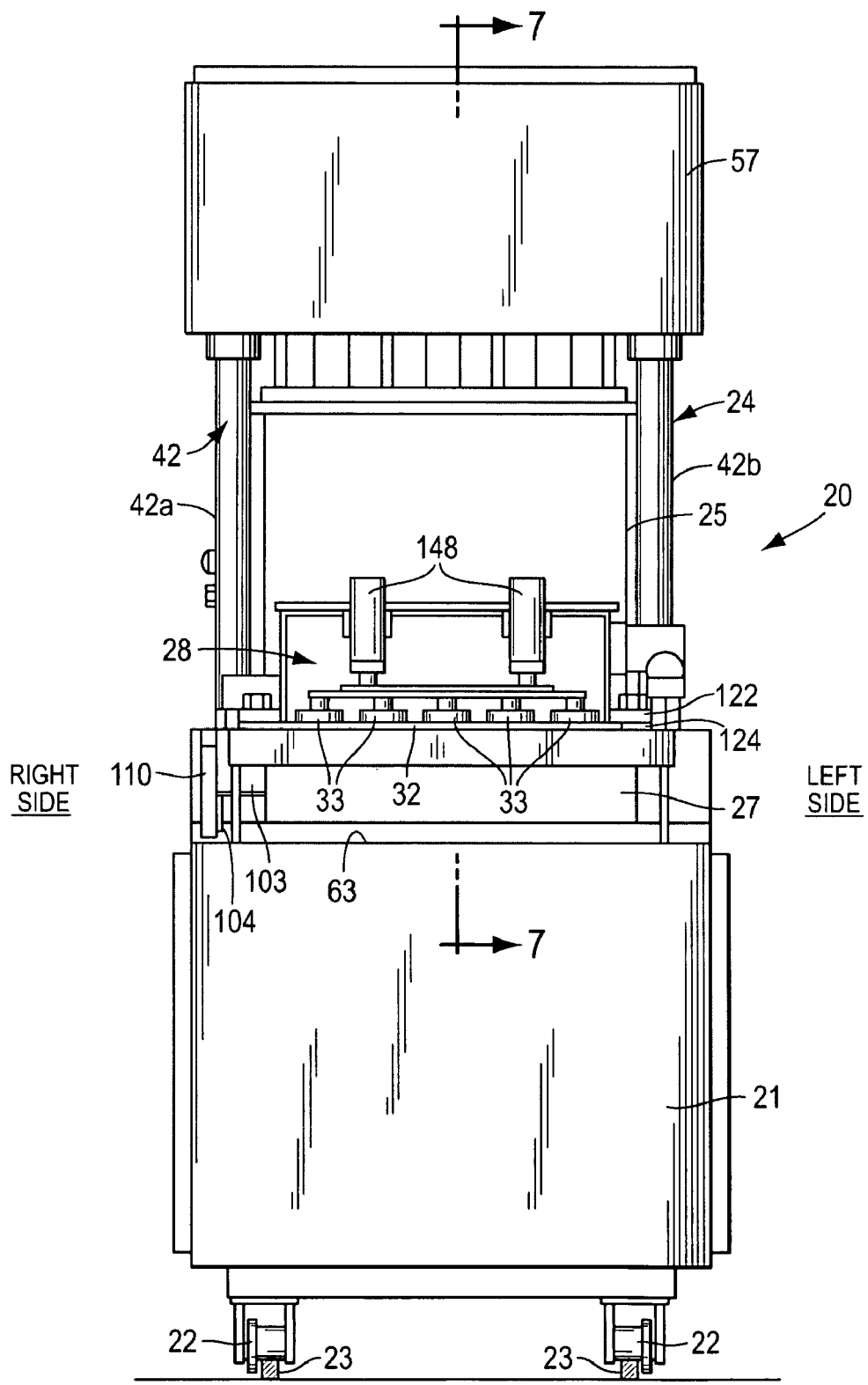
FIG. 3 is an outlet end view taken as indicated by line 3-3 in FIG. 1.

The directions "left" side and "right" side of the patty-forming machine are according to the convention shown in FIG. 3.

The General Organization and Operation of the Patty Molding Machine

The high speed food patty molding machine 20 illustrated in FIGS. 1-34 comprises a preferred embodiment of the invention. The machine 20 constitutes an improvement over the commercially successful FORMAX® F26™ patty-forming machine. The FORMAX® F26™ patty-forming machine is generally described in U.S. Pat. Nos. 3,887,964 (RE 30,096), 4,356,595 and 4,996,743. These patents are herein incorporated by reference to assist in the understanding of the basic operation and configuration of the machine 20, except as modified herein.

As shown in FIG. 1, molding machine 20 includes a machine base 21, preferably mounted upon a plurality of rollers or wheels 22. Machine base 21 comprises an external skin 21a and an internal frame 21b and supports the operating mechanism for machine 20. The base 21 comprises a mechanical compartment that contains hydraulic actuating systems, electrical actuating systems, and most of the machine controls.

Figure 5:
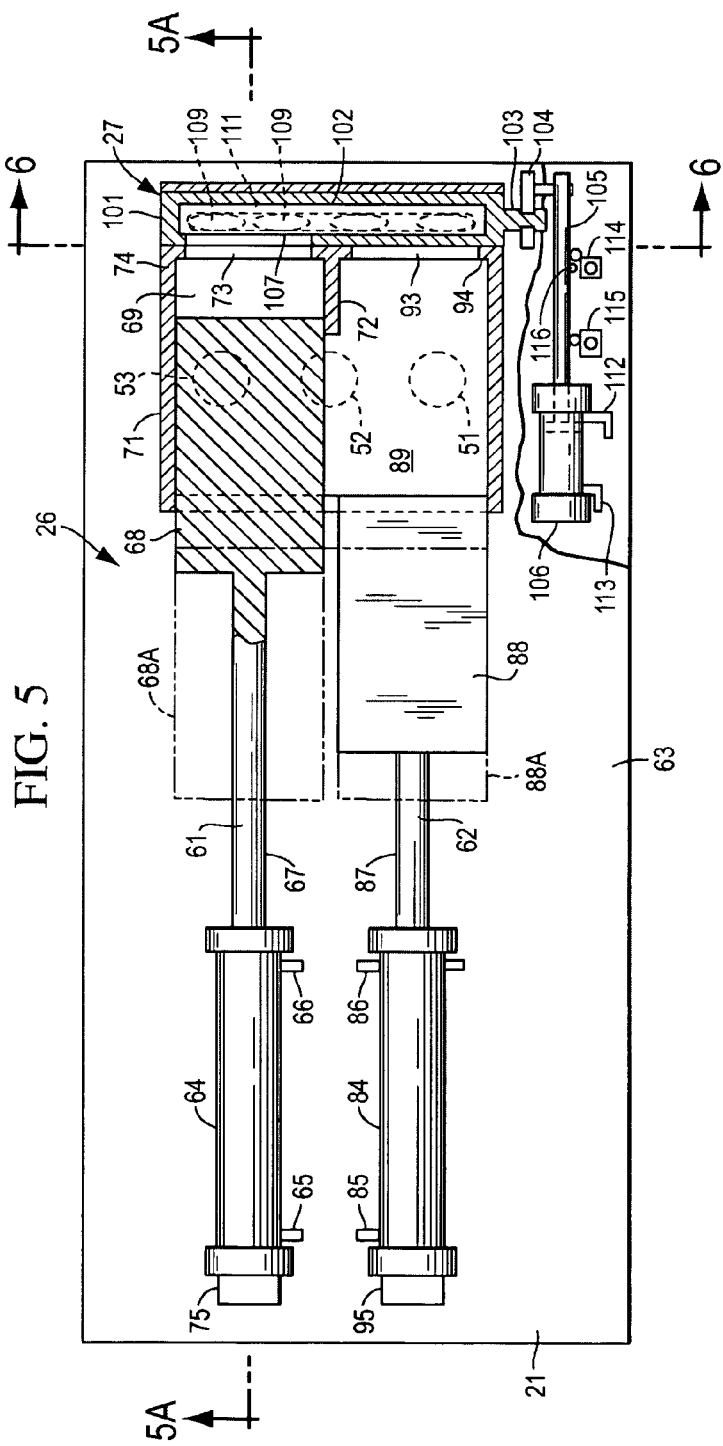
FIG. 5 is a sectional plan view of the pumping apparatus taken approximately as indicated by line 5-5 of FIG. 1.

Molding machine 20 includes a supply system 24 for supplying a moldable food material, such as ground beef, fish, or the like, to the processing mechanisms of the machine. As generally illustrated in FIGS. 1 and 3, supply system 24 comprises a large food material storage hopper 25 that opens into the intake of a food pump system 26 (FIG. 5). The exterior surface of the storage hopper has a hygienic logo 25a permanently etched into stainless steel surface. The food pump system 26 includes at least two food pumps, described in detail hereinafter, that continuously pump food, under pressure, into a manifold 27 connected to a cyclically operable molding mechanism 28. Molding mechanism 28 is provided with an elevator system for use in changing the molding mechanism from one product to another, as described in detail hereinafter.

In the operation of machine 20, a supply of ground meat or other moldable food material is dumped into hopper 25 from overhead. The floor of hopper 25 comprises a conveyor belt 31 for moving the food material longitudinally of the hopper toward the other components of the food material supply system 24.

At the forward end of hopper 25, the right hand end of the hopper as seen in FIG. 1, the food material is fed downwardly by the supply system 24 into the intake of the reciprocating pumps constituting pumping system 26. The pumps of system 26 operate in overlapping alteration to each other; at any given time when machine 20 is in operation at least one of the pumps is forcing food material under pressure into the intake of manifold 27.

The manifold 27 comprises a valving system for feeding the food material, still under relatively high pressure, into the molding mechanism 28. Molding mechanism 28 operates on a cyclic basis, first sliding a multi-cavity mold plate 32 into receiving position over manifold 27 and then away from the manifold to a discharge position aligned with a series of knockout cups 33. When mold plate 32 is at its discharge position, knockout cups 33 are driven downwardly, discharging the hamburgers or other molded products from machine 20, as indicated by arrow A in FIG. 1.

An elevated mirror 25g allows operating personnel to view inside the hopper 25.

Improved Infeed Conveyor

Figure 2:
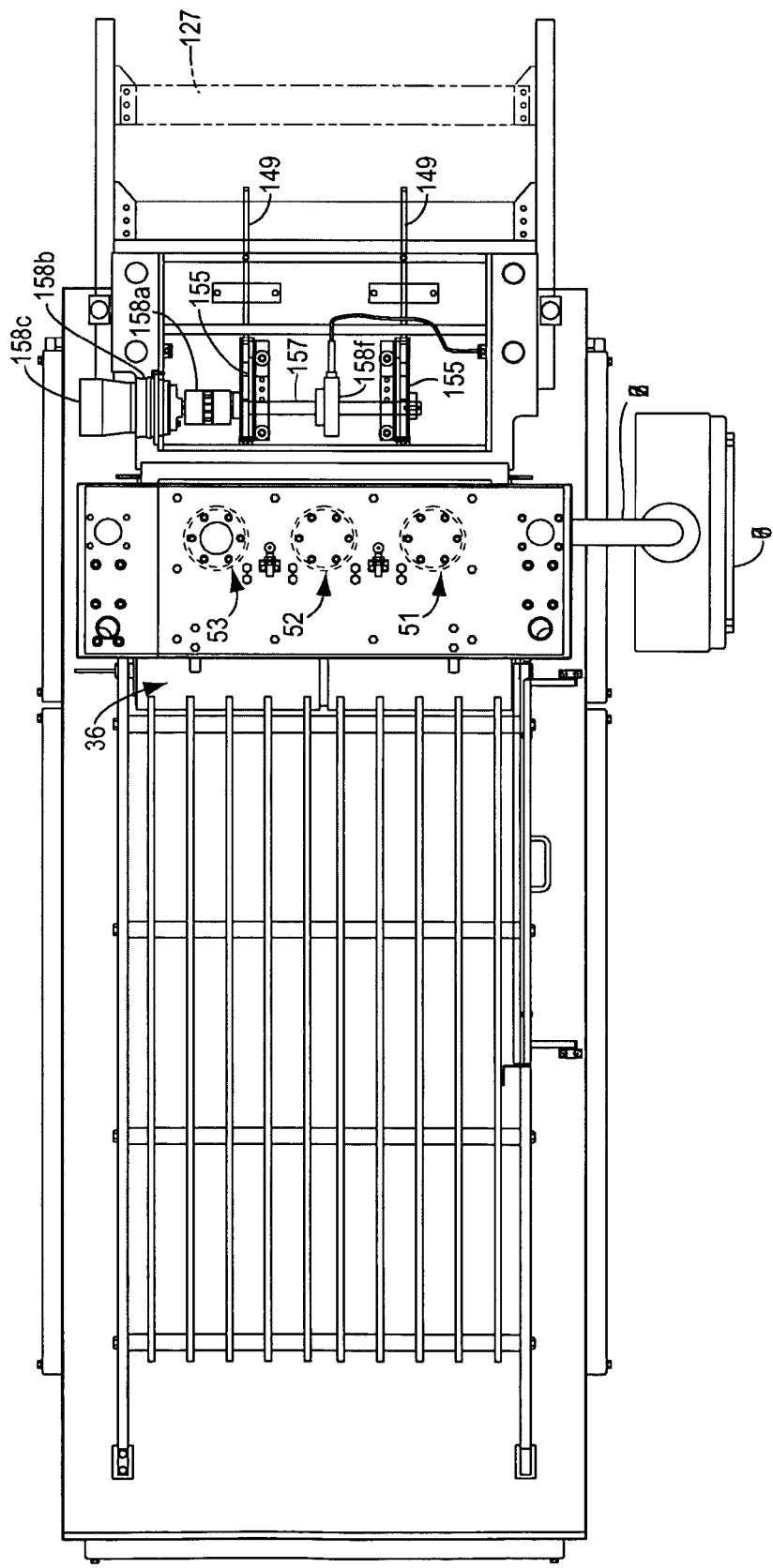
FIG. 2 is a partial plan view taken approximately along line 2-2 of FIG. 1.

The food supply system 24 and associated hopper 25 are illustrated in FIGS. 1 and 2. As understood, conveyor belt 31 extends completely across the bottom of hopper 25, around an end roller 35 and a drive roller 36.

According to the invention, the drive roller 36 comprises a sealed drum motor. The sealed drum motor is located inside the roller. Such drum rollers are available from ITOH DENKI. The use of a drum motor eliminates the need for chains and sprockets such that the roller could be driven from the machine motor. Furthermore, the use of a drum motor allows the drive to be more effectively sealed since only an electrical connection need be connected.

Improved Feed Screw System

The forward end of hopper 25 communicates with a vertical pump feed opening 39 that leads downwardly into a pump intake chamber 41. An inverted U-shaped frame 42 is mounted on machine base 21, extending over hopper 25. The frame 42 comprises a thick support plate 43 affixed to upper portions of a right column 42a and a left column 42b. The support plate 43 extends over the pump feed opening 39 in hopper 25.

Figure 10:
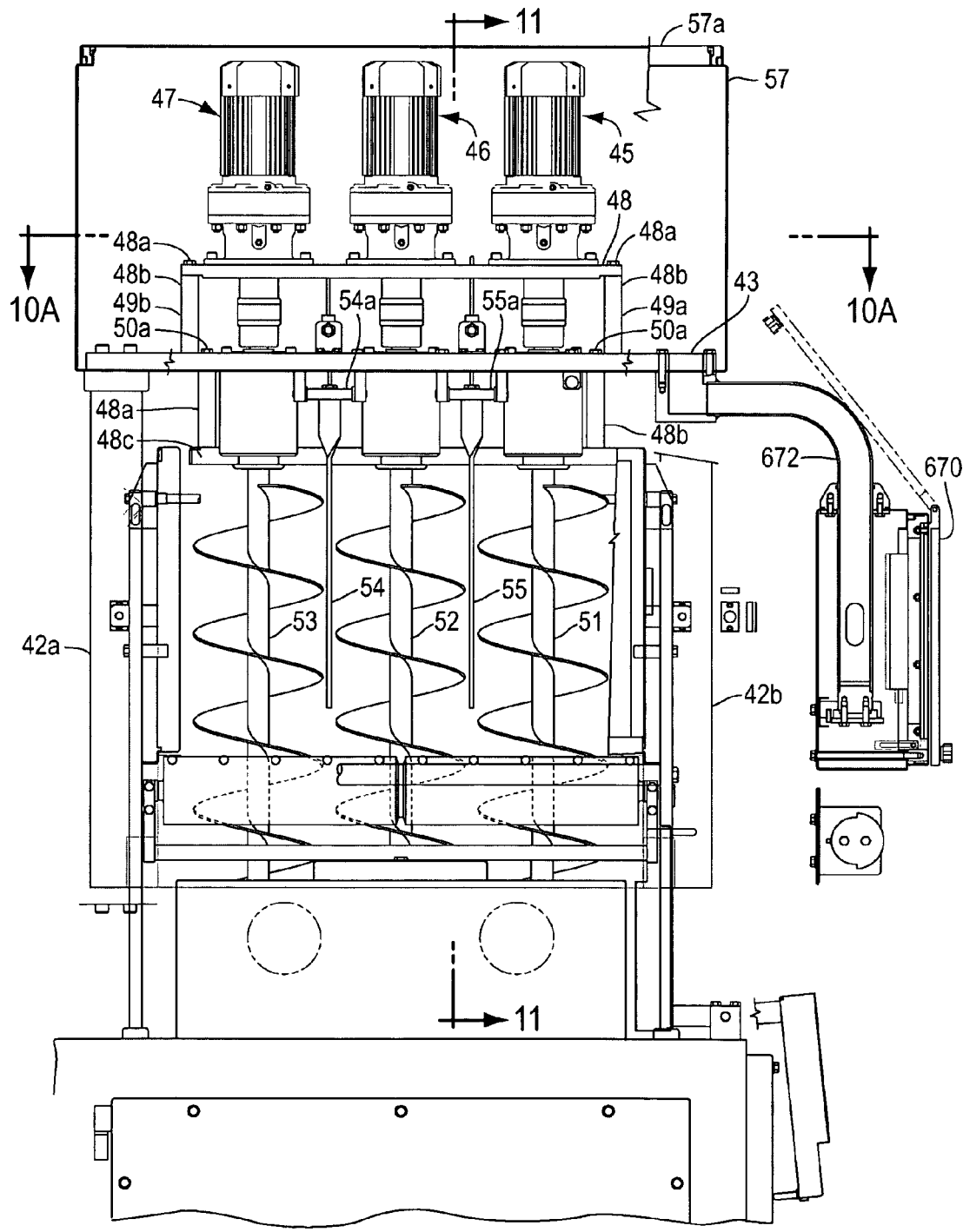
FIG. 10 is a sectional view, taken approximately along line 10-10 in FIG. 9, illustrating the supply apparatus for supplying moldable food material to the pumps of the patty molding machine, with some panels and components shown transparent to illustrate underlying components.
Figure 10A:
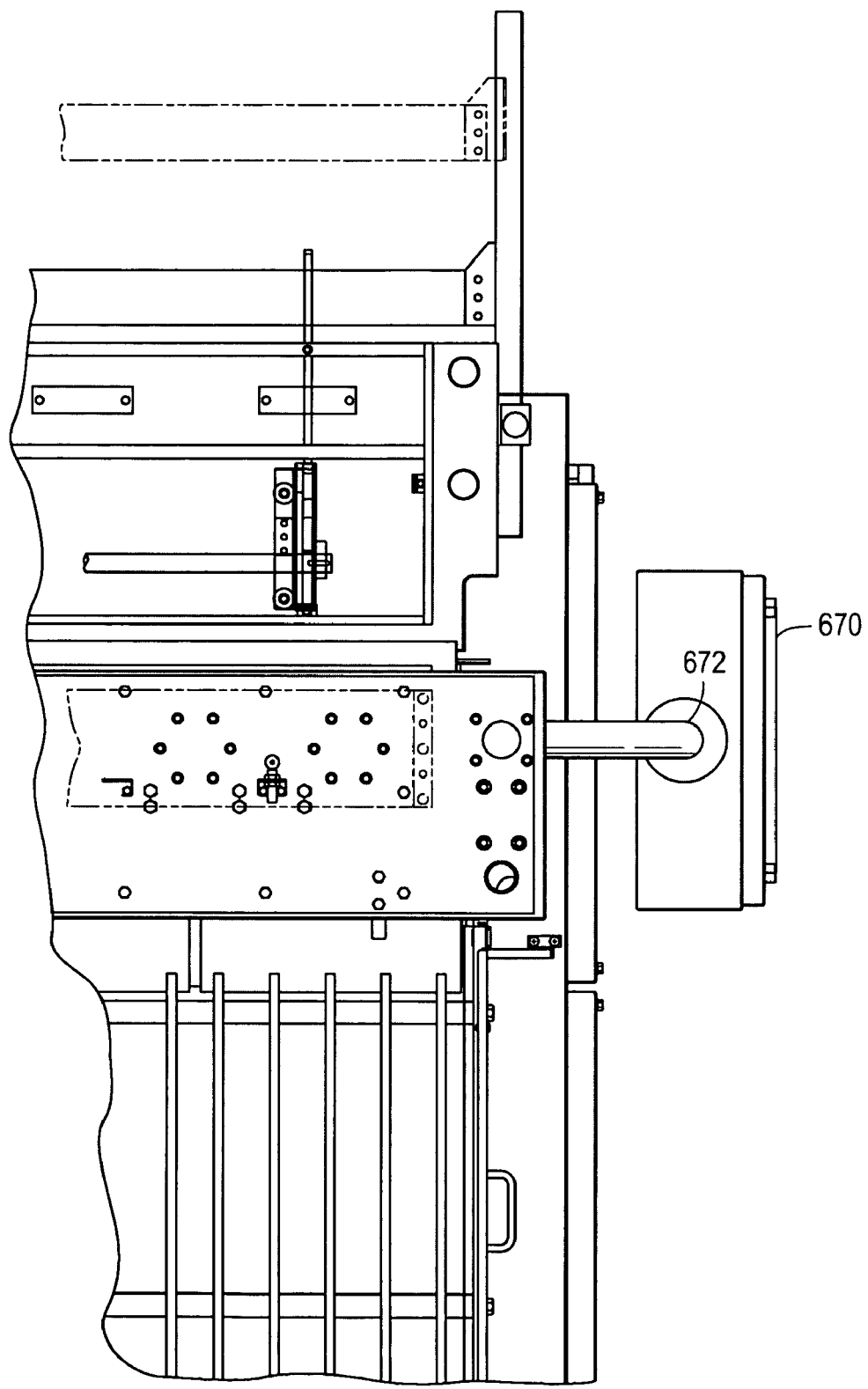
FIG. 10A is an enlarged, fragmentary sectional view taken generally along line 10A-10A of FIG. 10.
Figure 11:
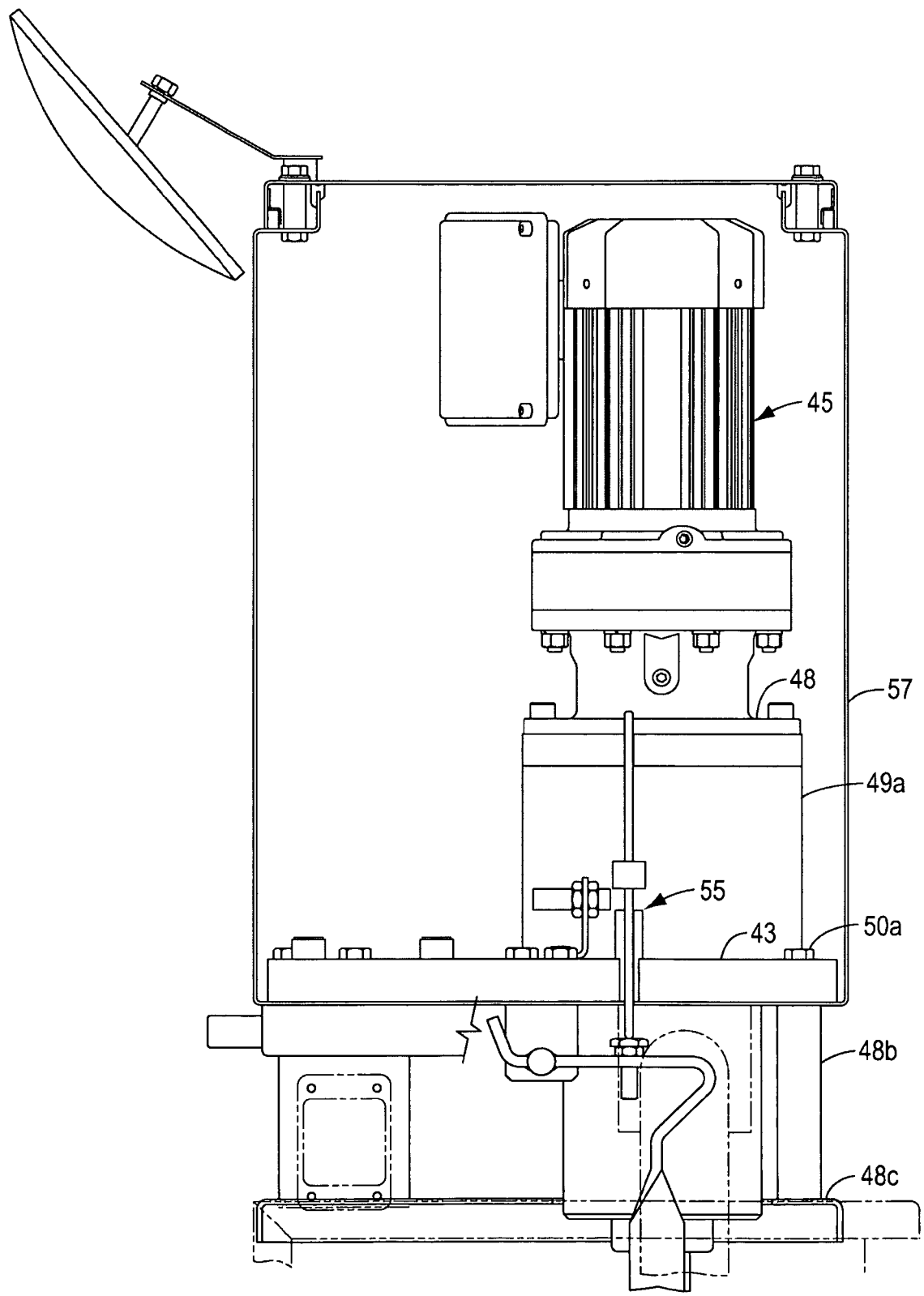
FIG. 11 is an enlarged fragmentary sectional view taken generally along line 11-11 in FIG. 10, with some panels and components shown transparent to illustrate underlying components.
Figure 12:
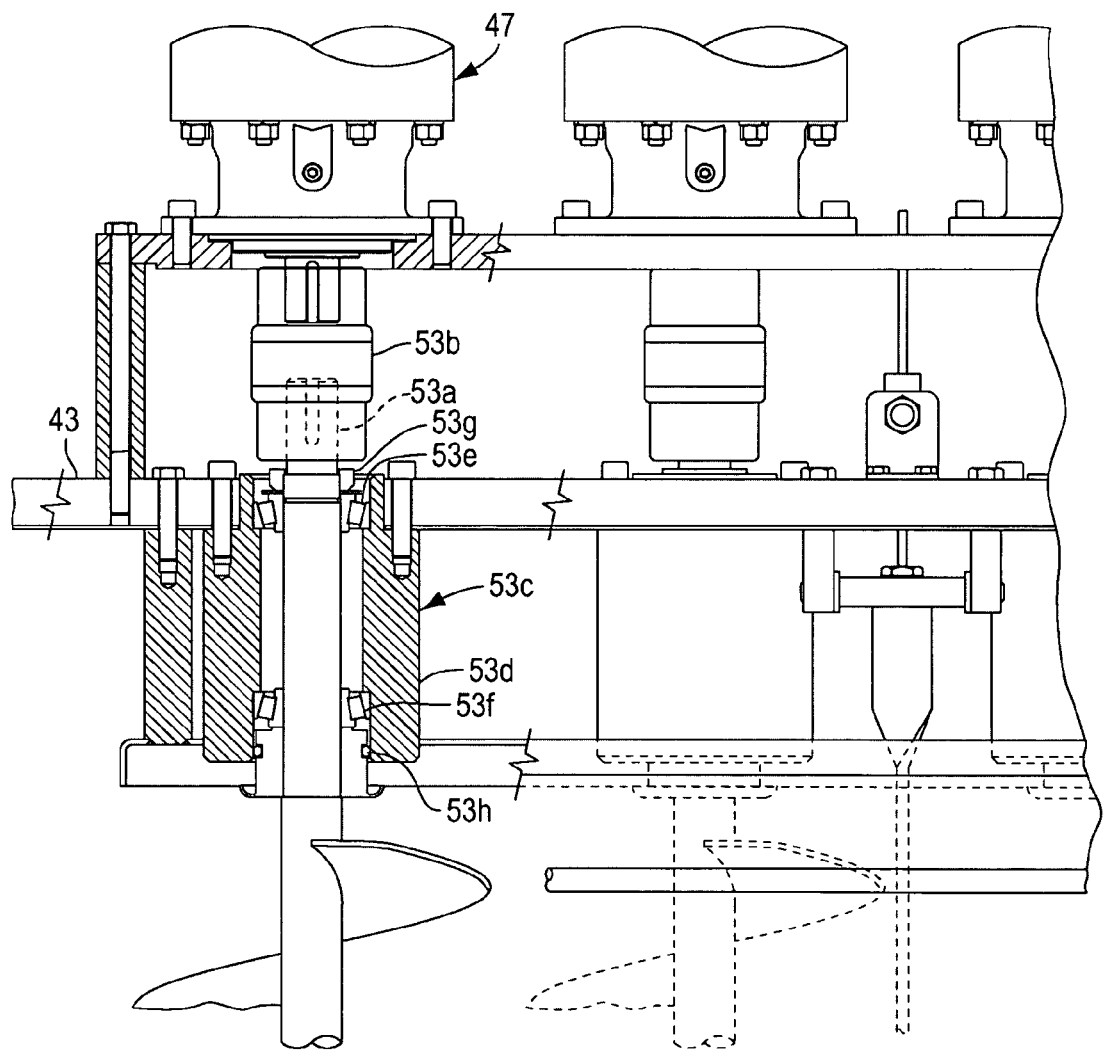
FIG. 12 is an enlarged fragmentary sectional view taken from FIG. 10.

As shown in FIG. 10, three electric feed screw drives 45, 46 and 47 are mounted upon a motor mount plate 48 that is mounted to and above the support plate 43 by long bolts 48a and end walls 49a, 49b. The plate 43 includes tapped holes to engage the bolts 48a. Bolts 50a and sleeves 48b extend down from the support plate 43 to hold a cover or shield 48c around and above the feed screws 51-53.

According to the invention the feed screw drives 45, 46, 47 comprise compact, integrated electric motor/gearbox assemblies such as SUMITOMO model #CNVMO5-6100YC-35, 0.5 horsepower.

Drive 45 drives a feed screw 51 that extends downwardly through opening 39 in alignment with a pump plunger 88. Drive 46 drives a centrally located feed screw 52, whereas drive 47 drives a third feed screw 53, located at the opposite side of hopper 25 from screw 51 and aligned with another pump plunger 68.

The feed screws 51, 52, 53 include heavy wall thickness flights of about 0.25 inches.

The drives 45-47 are substantially identical and the feed screws 51-53 are substantially identical.

The apparatus according to the invention includes a modular feed screw bearing assembly for each drive 45-47. A shown in FIG. 12, by way of example, the drive 47 is coupled to a feed screw shaft 53a by a coupling 53b. The shaft 53a is journaled for rotation by a bearing assembly 53c. The bearing assembly 53c comprises an outer housing 53b that includes upper roller bearings 53e and lower roller bearings 53f as well as an upper seal 53g and lower seal 53h. The bearing assembly 53c is fastened to the support plate 43. Because the bearing assembly 53c is separately mounted to the support plate 43, the drive 47 can be removed without removing the bearing assembly 53c.

The apparatus according to the invention comprises a one piece stainless steel feed screw drive enclosure 57. The support plate 43 is placed within the enclosure 57 as part of the assembly. A cover 57a is fastened onto the enclosure 57. The cover 57a is sealed to the enclosure 57 using a double seal as described with regard to the door seals in FIG. 21.

The apparatus of the invention provides two independent level sensing elements 54, 55 extending downwardly from shafts 54a, 55a as shown in FIG. 10. The level sensing elements are pneumatically biased and configured as described in U.S. Pat. No. 7,255,554, herein incorporated by reference. As the moldable food material 38 is moved forwardly in the hopper 25, it may accumulate to a level at which it engages the depending sensing fingers 54 and 55. When this occurs, shafts 54a, 55a are rotated and actuate limit switches, or send signals to the machine control, to interrupt the drive for roller 36 of conveyor 31, or keep the conveyor running until both level sensing elements 54, 55 sense high food product levels. In this manner the accumulation of meat or other food material at the outlet end 39 of hopper 25 is maintained at a safe level.

By making the level sensing elements 54, 55 independent, a closer control can be achieved when the food material in the hopper is unevenly distributed.

When machine 20 is in operation, the feed screw drives 45 and 46 are energized whenever plunger 88 is withdrawn to the position shown in FIG. 5, so that feed screws 51 and 52 supply meat from hopper 25 downwardly through opening 39 and into one side of the intake 41 of the food pumping system 26. Similarly, drives 46 and 47 actuate feed screws 52 and 53 to feed meat to the other side of intake 41 whenever plunger 68 is withdrawn. In each instance, the feed screw drives are controlled to shut off shortly after the plunger is fully retracted, avoiding excessive agitation of the meat. As the supply of food material in the outlet 39 of hopper 25 is depleted, conveyor belt 31 continuously moves the food forwardly in the hopper and into position to be engaged by feed screws 51-53. If the level of meat at the outlet end 39 of hopper 25 becomes excessive, conveyor 31 is stopped, as described above, until the supply at the hopper outlet is again depleted. The wall of the hopper outlet 39 immediately below conveyor drive roller 36 comprises a belt wiper blade 57 that continuously engages the surface of belt 31 and prevents leakage of the meat or other food material 38 from the hopper at this point.

The Food Pump System

The food pump system 26 of molding machine 20 is best illustrated in FIGS. 5, 5A, 7 and 13. As shown therein pump system 26 comprises two reciprocating food pumps 61 and 62 mounted upon the top 63 of machine base 21. The first food pump 61 includes a hydraulic cylinder 64 having two ports 65 and 66. A piston 67A in cylinder 64 (FIG. 5A) is connected to an elongated piston rod 67; the outer end of piston rod 67 is connected to a large plunger 68. Plunger 68 is aligned with a first pump cavity 69 formed by a pump cavity enclosure 71 that is divided into two chambers by a partial central divider wall 72. The forward wall 74 of pump cavity 69 has a slot 73 that communicates with the pump manifold 27 as described more fully hereinafter.

The second food pump 62 is essentially similar in construction to pump 61 and comprises a hydraulic cylinder 84 having ports 85 and 86. Cylinder 84 has an elongated piston rod 87 connected to a massive plunger 88 that is aligned with a second pump cavity 89 in housing 71. The forward wall 94 of pump cavity 89 includes a slot 93 communicating with manifold 27.

According to the apparatus of the invention a first linear displacement sensor 75 is affixed to the hydraulic cylinder 64 that drives the first pump plunger 68. A second, identical linear displacement sensor 95 is fixed to the hydraulic cylinder 84 that drives the plunger 88.

Figure 5A:
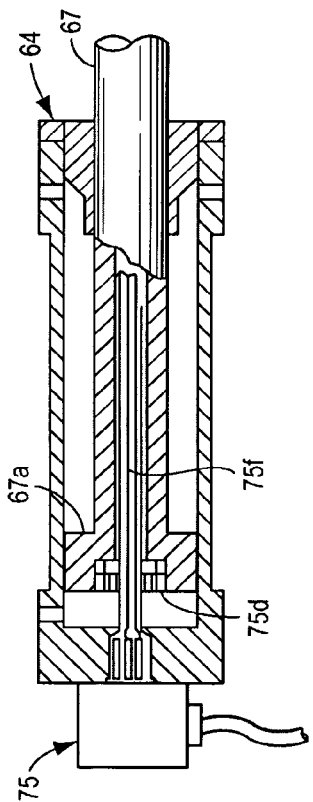
FIG. 5A is a sectional view taken generally along line 5A-5A of FIG. 5.
Figure 6:
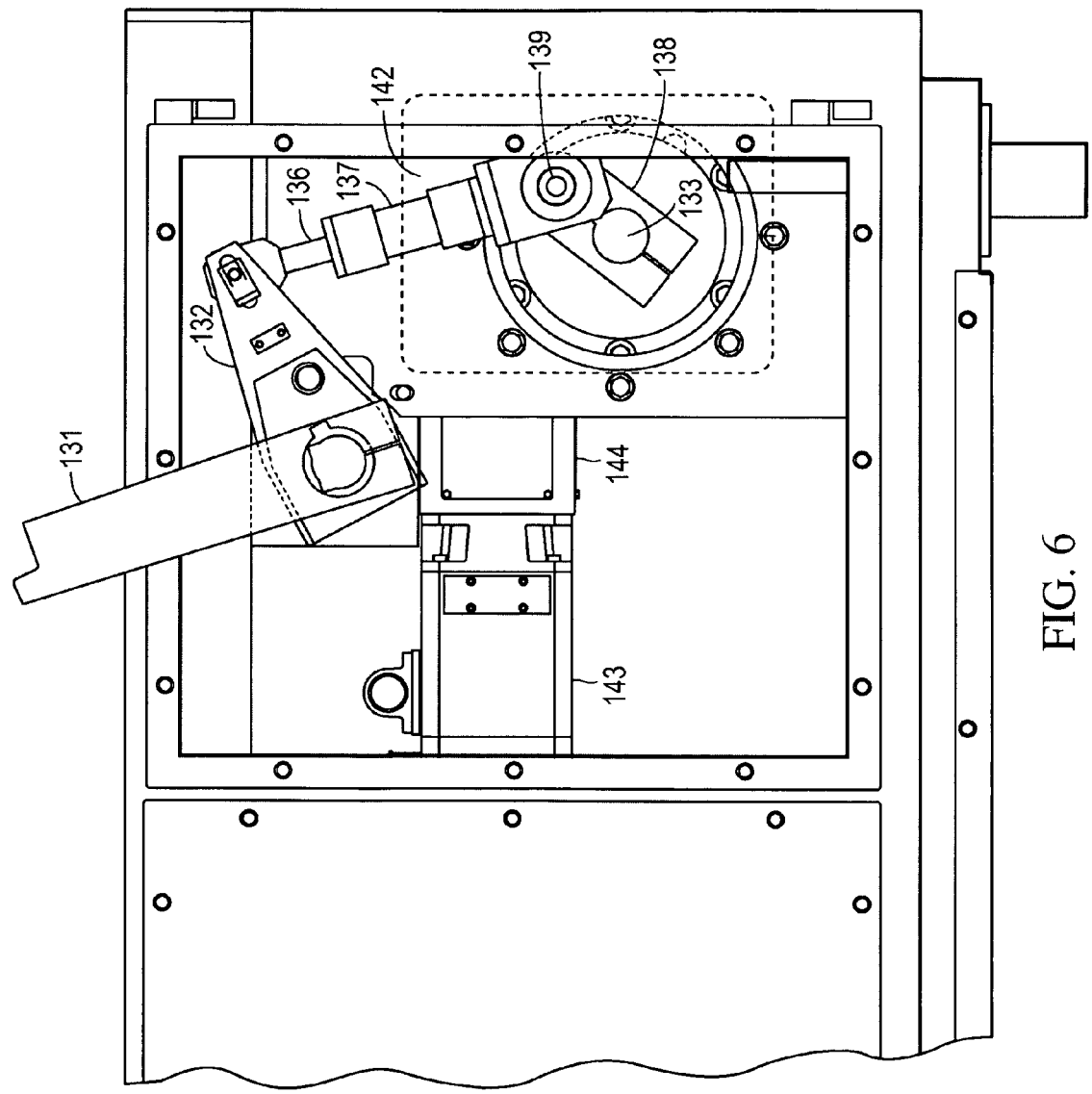
FIG. 6 is a simplified, fragmentary elevation view illustrating the drive for the molding mechanism of the patty molding machine, with some panels and components shown transparent to illustrate underlying components.

The linear displacement sensor 75 is shown in FIG. 5A. The sensor 95 is identical. The sensor includes a magnet 75d that influences a sensing rod 75f that penetrates into the cylinder 64, coaxially into the rod 67 to generate a position signal of the cylinder rod 67 with respect to the sensing rod 75f. Such a sensor 75 is available from BALLUF MICROPULSE® Transducer, Rod Series. The sensors are extremely accurate in reporting rod position to the machine controller.

In FIG. 5, the pumping system 26 is illustrated with the first pump 61 pumping the moldable food material into manifold 27 and with the second pump 62 receiving a supply of the moldable food material for a subsequent pumping operation. Pump 61 has just begun its pumping stroke, and has compressed the food product in pump cavity 69, forcing the moldable food material through slot 73 into manifold 27. As operation of molding machine 20 continues, pump 61 advances plunger 68 to compensate for the removal of food material through manifold 27, maintaining a relatively constant pressure on the remaining food in chamber 69.

As plunger 68 advances, the linear displacement sensor 75 senses that plunger 68 is near the end of its permitted range of travel. When this occurs, pump 62 is actuated to advance plunger 88 through pump cavity 89, compressing the food material in the second pump cavity in preparation for feeding the food from that cavity into manifold 27. When the food in the second pump cavity 89 is under adequate pressure, the input to manifold 27 is modified so that subsequent feeding of food product to the manifold is effected from the second pump cavity 89 with continuing advancement of plunger 88 of the second pump 62. After the manifold intake has been changed over, pump 61 is actuated to withdraw plunger 68 from cavity 69.

Thereafter, when plunger 88 nears the end of its pressure stroke into pump cavity 89, the linear displacement sensor 95 signals to the machine control the need to transfer pumping operations to pump 61. The changeover process described immediately above is reversed; pump 61 begins its compression stroke, manifold 27 is changed over for intake from pump 61, and pump 62 subsequently retracts plunger 88 back to the supply position shown in FIG. 5 to allow a refill of pump cavity 89. This overlapping alternating operation of the two pumps 61 and 62 continues as long as molding machine 20 is in operation.

The Pump Feed Manifold and Valve System

Figure 7:
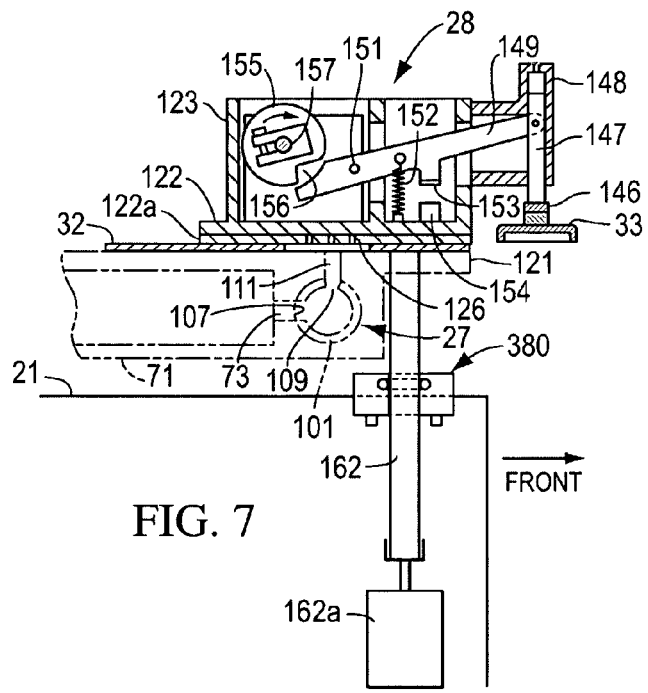
FIG. 7 is a fragmentary sectional view of the knockout drive and a part of the mounting apparatus for the molding mechanism of the patty molding machine.

The pump feed manifold 27, shown in FIGS. 5 and 7, comprises a manifold valve cylinder 101 fitted into an opening 102 in housing 71 immediately beyond the pump cavity walls 74 and 94. One end wall of valve cylinder 101 includes an externally projecting shaft 103 connected to a drive link 104, in turn connected to the end of the piston rod 105 of a hydraulic actuator cylinder 106. Actuator 106 has two fluid ports 12 and 13. Two sensing switches 114 and 115 are positioned adjacent piston rod 105 in position to be engaged by a lug 116 on the piston rod.

Valve cylinder 101 includes two longitudinally displaced intake slots 107 and 108 alignable with the outlet slots 73 and 93, respectively, in the pump cavity walls 74 and 94. However, slots 107 and 108 are angularly displaced from each other to preclude simultaneous communication between the manifold and both pump cavities 69 and 89. Cylinder 101 also includes one or more outlet openings 109. The outlet openings 109 can be as described in U.S. Pat. No. 7,255,554, herein incorporated by reference.

The valve cylinder outlet opening 109 is generally aligned with a slot 111 in housing 71 that constitutes a feed passage for molding mechanism 28.

FIG. 5 illustrates the operating condition maintained for manifold 27 whenever pump 61 is supplying food material under pressure to molding mechanism 28. Actuator cylinder 106 has advanced piston rod 105 to the outer limit of its travel, angularly orienting the manifold valve cylinder 101 as shown in these figures. With cylinder 101 in this position, its intake slot 107 is aligned with the outlet slot 73 from pump cavity 69 so that food material is forced under pressure from cavity 69 through the interior of valve cylinder 101 and out of the valve cylinder outlet openings 109 through slot 111 to the molding mechanism 27. On the other hand, the second intake slot 108 of valve cylinder 101 is displaced from the outlet slot 93 for the second pump cavity 89. Consequently, the food material forced into the interior of valve cylinder 101 from pump cavity 69 cannot flow back into the other pump cavity 89.

When molding machine 20 changes over between pump 61 and pump 62, manifold 27 is actuated to its alternate operating conditions by actuator 106, which retracts piston rod 105 and rotates valve cylinder 101 through a limited angle in a rotary direction.

In an alternate operating condition, intake slot 107 of cylinder 101 is displaced from the first pump cavity outlet slot 73 so that food material can no longer flow into or out of cylinder 101 from pump cavity 69. On the other hand, the other intake slot 108 of cylinder 101 is now aligned with the outlet slot 93 from pump cavity 89, so that food material is forced under pressure through slots 93 and 108 into the interior of cylinder 101 and out of the cylinder through openings 109 and 111 to the molding mechanism of the machine.

When pumping from cavity 89 of pump 62 is subsequently terminated, and pumping is resumed from cavity 69 of pump 61 as described above, hydraulic actuator 106 again operates to extend piston rod 105. The movement of rod 105, through link 104, rotates valve cylinder 101 counterclockwise. This restores manifold 27 to the appropriate operating condition for pumping of food material from cavity 69 to the molding mechanism of the machine.

The Molding Mechanism

Improved Mold Plate

The apparatus of the invention is particularly adapted to use a balanced mold plate configuration as described in U.S. application Ser. No. 60/844,789, filed Sep. 15, 2006.

Improved Mold Plate Drive

The upper surface of the housing 71 that encloses the pump cavities 69 and 89 and the manifold 27 comprises a support plate 121 that projects forwardly of the housing, and that affords a flat, smooth mold plate support surface. The mold plate support 121 may be fabricated as a separate plate bolted to or otherwise fixedly mounted upon housing 71. It includes the upper portion of the manifold outlet passage 111.

Figure 14:
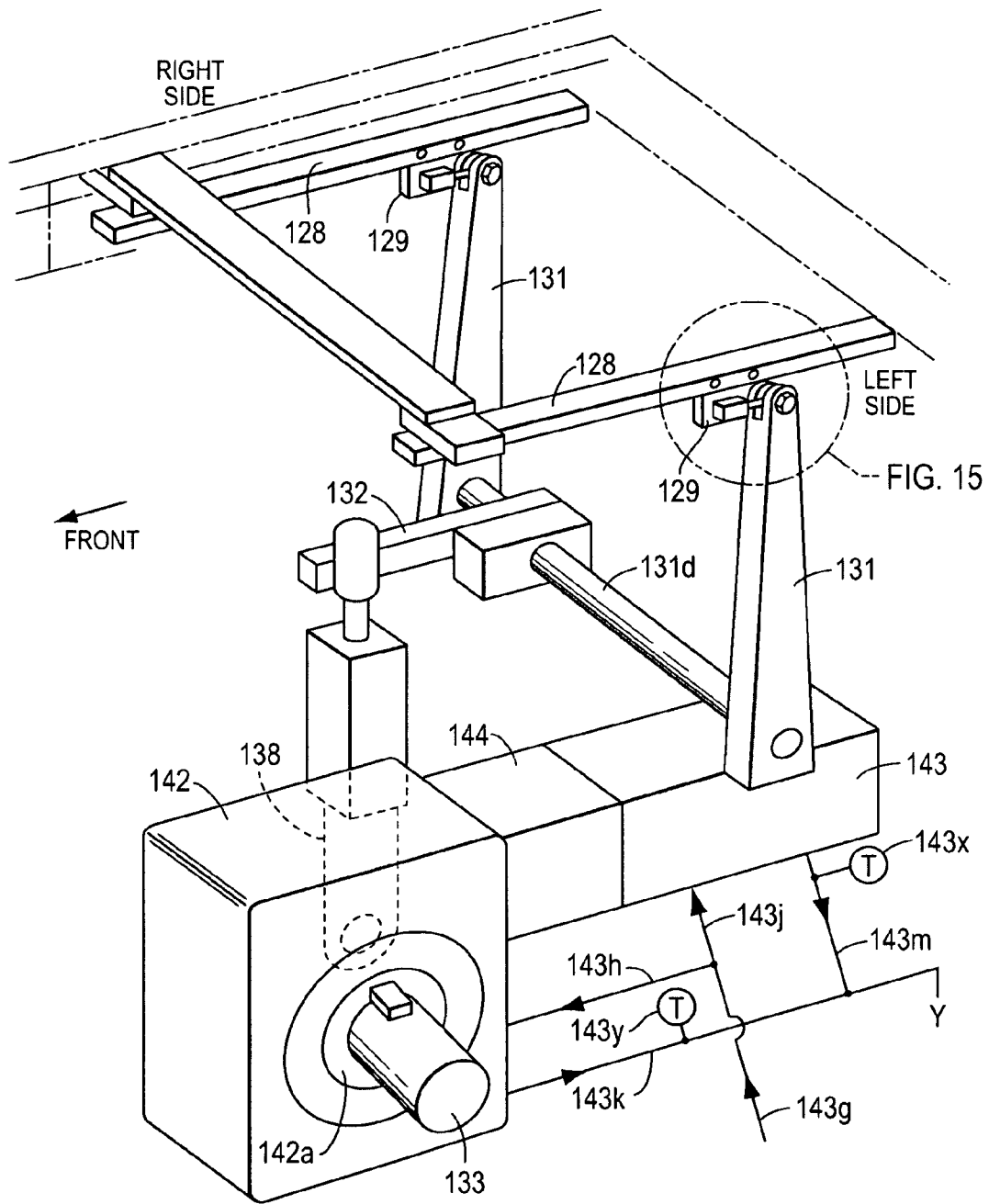
FIG. 14 is a simplified diagrammatic perspective view of a mold plate drive system according to the invention.

Mold plate 32 is supported upon plate 121. Mold plate 32 includes a plurality of individual mold cavities 126 extending across the width of the mold plate and alignable with the manifold outlet passageway 111, as shown in FIG. 14. A cover plate 122 including a breather plate 122a is disposed immediately above mold plate 32, closing off the top of each of the mold cavities 126. The breather plate includes apertures in registry with the mold cavity and an air exhaust channel back to the food product supply. Breather plates are disclosed in U.S. Pat. No. 7,255,554, herein incorporated by reference. A housing 123 is mounted upon cover plate 122. The spacing between cover plate 122 and support plate 121 is maintained equal to the thickness of mold plate 32 by support spacers mounted upon support plate 121; breather plate 122a rests upon spacers when the molding mechanism is assembled for operation. Cover plate 122 is held in place by four mounting bolts 125.

Mold plate 32 is connected by a drawbar 127 to a pair of plate drive arms 128 that extends alongside housing 71 and are each connected at one end to a swing link 129. The other end of link 129 is pivotally connected to a rocker arm 131. The rocker arms 131 are fixed onto a center shaft 131d to oscillate together. The rocker arms 131 are connected to a motor drive arm 132 via the center shaft 131d that is connected to a crank arm 138 that is driven by the output of the reducer 142, forming a crank pivoted on a fixed shaft 133. This arrangement is described more completely in U.S. Pat. No. 3,887,964, and well known as the construction of the current FORMAX® F-26™ patty-forming machine. The free end of crank arm 138 is provided with a lost motion connection as described in U.S. Pat. Nos. 3,887,964 or 4,996,743, herein incorporated by reference.

Additionally, an improved drive linkage and associated hydraulic circuit can be provided such as disclosed in U.S. Pat. No. 4,996,743, herein incorporated by reference.

Figure 14A:
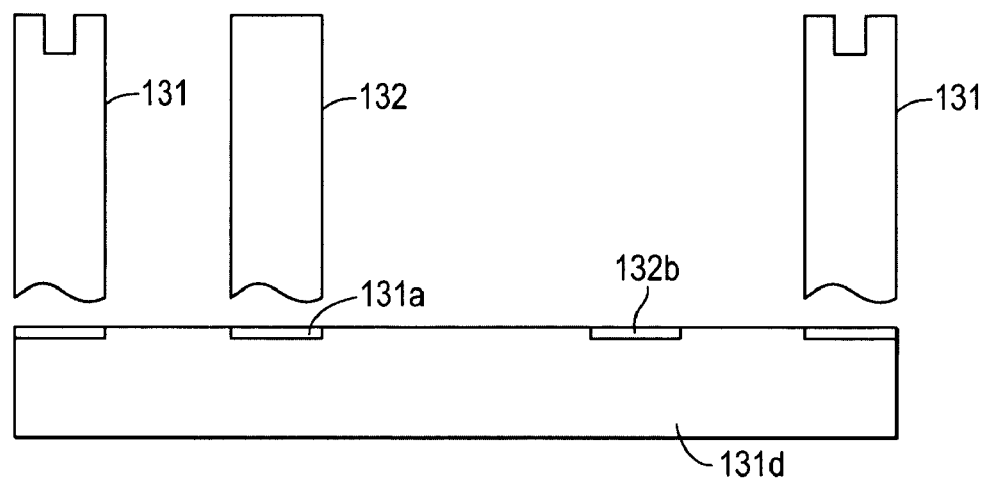
FIG. 14A is a diagram in elevation view of a portion of the mold plate drive shown in FIG. 14.

According to one aspect of the invention, shown in FIG. 14A, the center shaft 131d is reversible in that it has a spare keyway machined in the center shaft 131d for locking in the motor drive arm 132. The arm 132 is connected to the center shaft 131d at an unequal distance between the rocker arms 131. If one keyway 132a becomes damaged the center shaft can be reversed (the ends switched) to use a non-damaged keyway 132b.

Figure 14B:
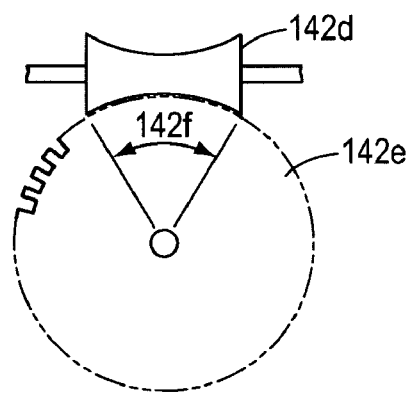
FIG. 14B is a diagram in elevation view of a portion of the mold plate drive shown in FIG. 14.

The apparatus according to the invention provides an improved drive and an improved gear reducer 142. The improved reducer 142 can be an APEX series AD110 with a 20:1 reduction. The drive includes a servomotor 143 connected by a coupling 144 to an input shaft of the reducer 142. The servomotor is C-face mounted to the reducer with a double enveloping worn gear. This is demonstrated in FIG. 14B wherein a worm gear 142d within the reducer 142 is enmesh with a main gear 142e to the extent that it includes an arc 142f of gear teeth, rather than a minimal point or line contact.

Preferably, the servomotor is a SIEMENS #1FT6084-8WF71-1TAO servomotor which produces a torque of 35NM continuous torque and 65 NM peak torque.

The reducer 142 includes a sleeve 142a that rotates with the output shaft 133. The output shaft 133 is keyed to the sleeve 142a. If the shaft 133 becomes damaged, the output shaft 133 can be removed from the sleeve 142a without disassembly of the internals of the reducer 142. Also, the input shaft for connection to the coupling 144 is above the centerline of the shaft 133.

The reducer 142 and the servomotor 143 are water cooled for long life. Domestic water supply 143g enters both the reducer 142 and the servomotor 143 in parallel streams 143h, 143j and exit in parallel streams 143k, 143m. Temperature sensors 143y, 143x sense the water exit temperatures and can communicate an overheating condition to the machine control for either a warning signal or a machine shutdown. The water from the outlets 143k, 143m is disposed to drain.

Figure 15:
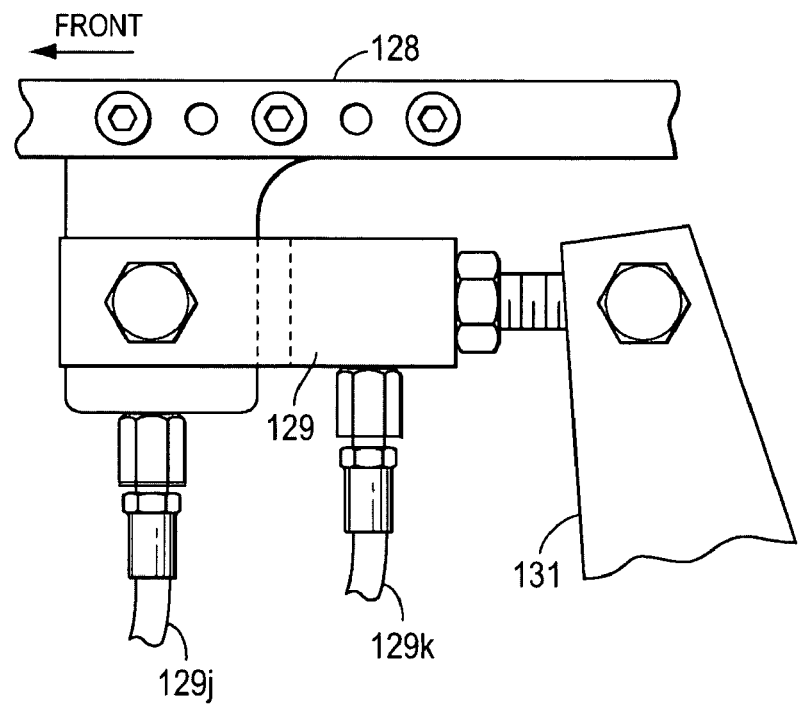
FIG. 15 is an enlarged, fragmentary, left side elevation view of a portion of the apparatus shown in FIG. 14.
Figure 16:
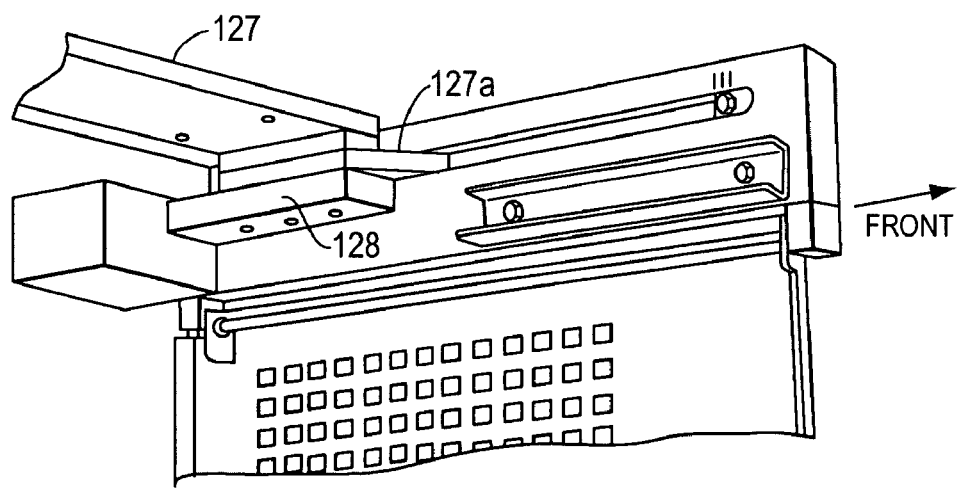
FIG. 16 is a fragmentary perspective view of a portion of the apparatus shown in FIG. 14.
Figure 17:
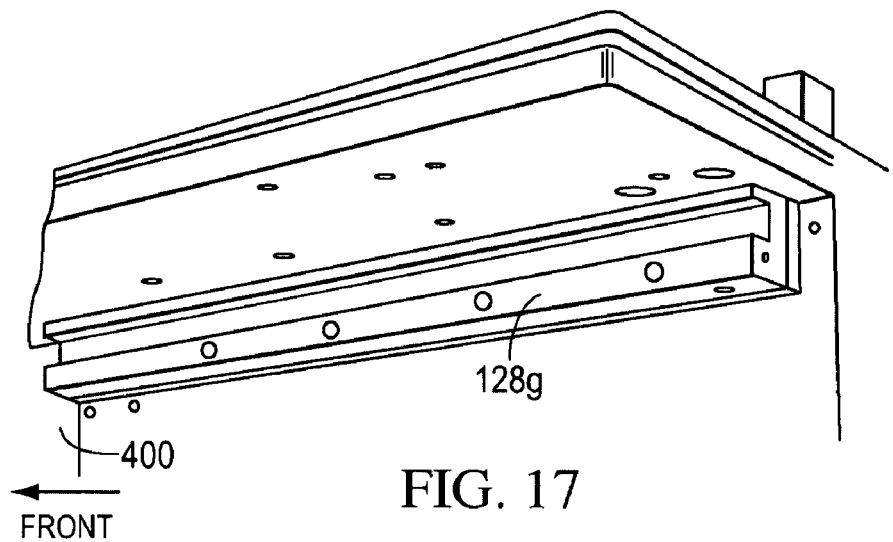
FIG. 17 is a fragmentary perspective view of a portion of the apparatus shown in FIG. 14.
Figure 18:
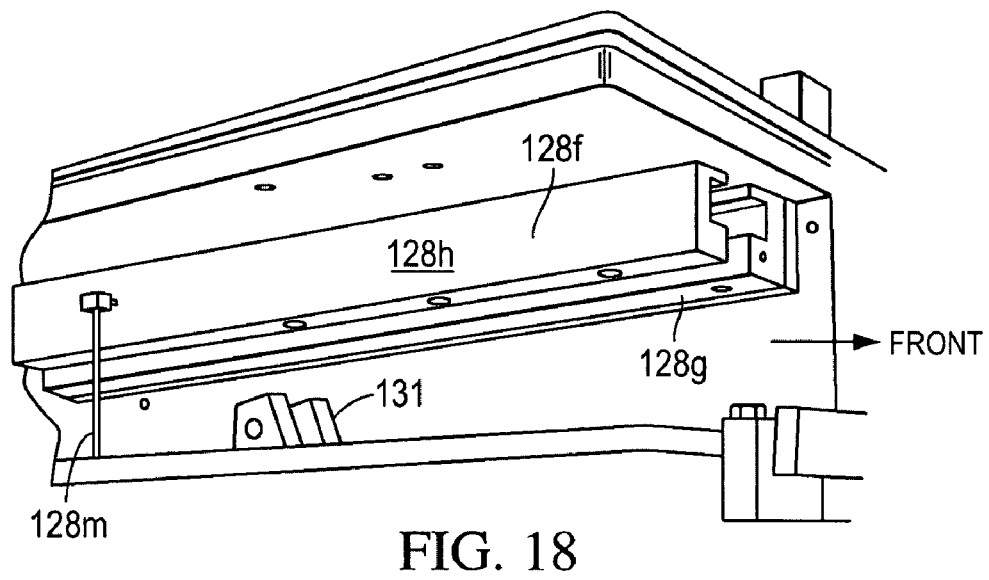
FIG. 18 is a fragmentary perspective view of the portion of the apparatus shown in FIG. 17 in a further stage of assembly.
Figure 19:
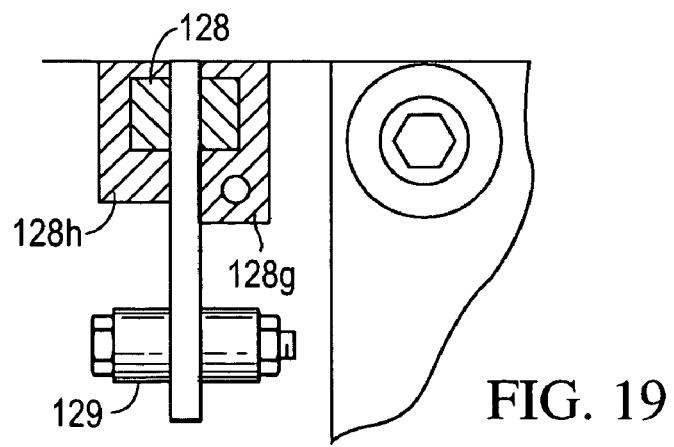
FIG. 19 is a enlarged sectional view taken generally along line 19-19 of FIG. 4B.

The apparatus according to the invention includes longer, non-rectangular drawbar bearings 127a (FIGS. 9 and 23) for reduced wear and reduced maintenance. The drawbar bearings are preferably composed of AMPCO 21 and are lubricated. Additionally, the drive arms 128 are connected to the swing links 129 at a position in front of the rocker arms 131 as shown in FIGS. 14 and 15. This allows for a longer drive arm bearing 128f that comprises inner and outer bearings 128g, 128h (FIGS. 17-19). The bearings preferably are composed of C95400 aluminum bronze and are lubricated by oil line 128m. The pivotal link is lubricated by two oil lines 129j, 129k as shown in FIG. 15.

Improved Knockout Mechanism

The apparatus of the invention eliminates all sprockets, chains, spline shafts, universal joints, timing belts and pulleys of the current FORMAX® F-26™ patty-forming machine. The apparatus of the invention is anticipated to achieve a smoother, quieter, more energy efficient and more controllable machine by using a servo drive for the knockout drive.

Molding mechanism 28 further comprises a knockout apparatus shown in FIGS. 2, 3, 7, and 9-9B. The knockout apparatus comprises the knockout cups 33, which are affixed to a carrier bar 145 that is removably mounted upon a knockout support member 146. Knockout cups 33 are coordinated in number and size to the mold cavities 126 in mold plate 32; there is one knockout cup 33 aligned with each mold cavity 126 and the mold cavity size is somewhat greater than the size of an individual knockout cup.

Knockout support member 146 is carried by two knockout rods 147. Each knockout rod 147 is disposed in an individual housing 148 and is pivotally connected to its own knockout rocker arm 149.

Each knockout rocker arm is pivotally mounted upon a shaft 151. There, a pair of springs 152 is connected to each knockout rocker arm 149, biasing the arm toward movement in a clockwise direction as seen in FIG. 7. Clockwise movement of each rocker arm 149 is limited by a stop 153 aligned with a bumper 154 mounted in housing 123.

Each rocker arm 149 is normally restrained against counterclockwise movement by engagement with a knockout cam 155; the two cams 155 each have a notch 156 aligned with the corresponding notch on the other cam. Cams 155 are affixed to a knockout cam shaft 157.

The apparatus according to the invention comprises a servomotor drive 158 to drive the knockout apparatus. The knockout cam shaft 157 is connected via a coupling 158a to a gear reducer 158b that is connected to a servomotor 158c. A position target 158e is provided mounted to a disk 158f, fixed to the shaft, to register an initial or home position to a sensor 158g connected to machine control C.

The servomotor 158c drives the shaft 157 which drives the knockout apparatus. Preferably the servomotor is an ALPHA #TPM025-21R-600P-OH producing a torque of 1500 lb-in nominal torque and 2660 lb-in peak torque, or a SIEMENS #1FK7042-5AF71-1TAO producing 2.6NM continuous torque and 10.5 NM peak torque.

The apparatus also includes oil reservoirs 158j, 158k that are substantially sealed, including a closed top cover, except for windows in the top cover where wicks 158m extend from the reservoir to contact with parts that need lubrication.

Figure 8:
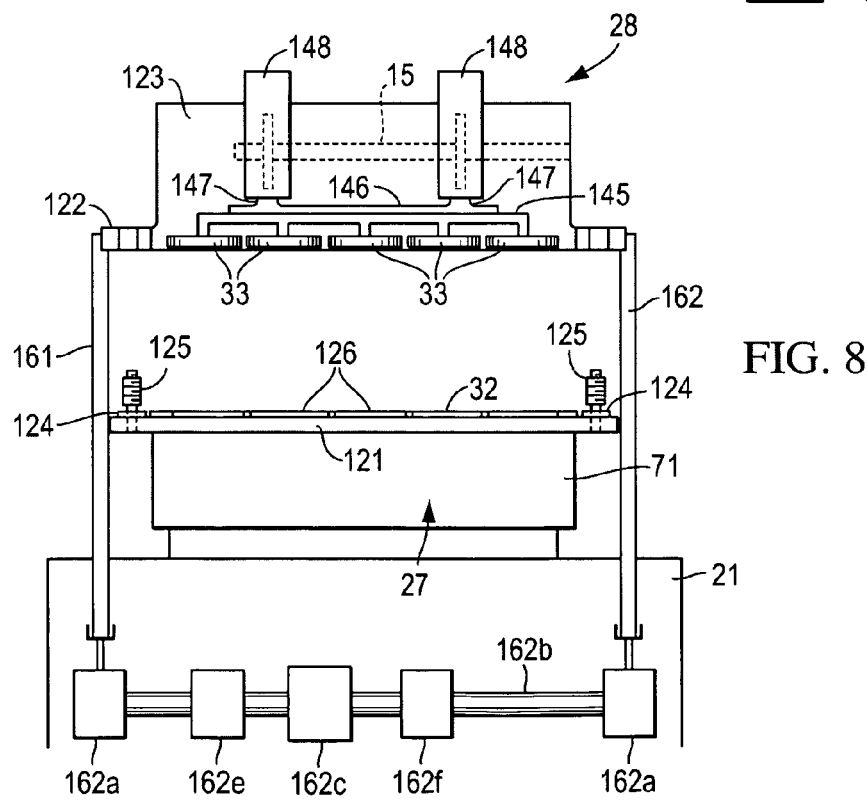
FIG. 8 is a diagrammatic view, partly in cross section, of a part of the molding mechanism in a position utilized during change of a mold plate.

As shown in FIGS. 7, 8, 23 and 24, two cover lift rods 161 and 162 are affixed to cover plate 122 on opposite sides of the machine and extend downwardly into machine base 21. The lower end of each lift rod 162 is supported by a right angle gear elevator 162a that is driven by an axle 162b that is driven by a hydraulic motor 162c via couplings 162e, 162f as shown in FIGS. 7 and 8. The operation of the lift rod arrangement is well known in the current FORMAX® F-26™ patty-forming machine and is only described schematically.

During a molding operation, the molding mechanism 128 is assembled as shown in FIG. 7, with cover plate 122 tightly clamped onto spacers. Gear reducer 142 (FIG. 13) is continuously driven by the servomotor 143.

In each cycle of operation, knockout cups 33 are first withdrawn upward, cams 155 pivoting knockout rocker arms 149 to their elevated positions to lift the knockout cups. The drive linkage from gear reducer 142 to mold plate 32 then slides the mold plate from the full extended position to the mold filling position, with the mold cavities 126 aligned with passageway 111.

The lost motion connections in the drive linkage assure some dwell time at the discharge or knockout position of mold plate 32, so that the knockout cups 33 have time to enter and leave the mold cavities 126 while mold plate 32 is at rest. Some dwell at the cavity filling position may also be provided. These knockout and fill dwells can also be accomplished by programming of the motion profiles of the servomotors 143, 158c such as described in U.S. Pat. No. 7,255,554, herein incorporated by reference.

Hydraulic cushion 137 allows crank 131 to pick up the mold plate load over several degrees of rotation, gradually overcoming the mold plate inertia. The lost motion connections and the hydraulic cushion 137 incorporated in the drive linkage for the mold plate thus reduce wear and tear on both the mold plate and its drive, assuring long life and minimum maintenance. It may be possible however that with the use of the servomotor mold plate drive, no lost motion or hydraulic cushion will be needed in the crank driven by the reducer 142.

During most of each cycle of operation of mold plate 32, the knockout mechanism remains in the elevated position, with knockout cups 33 clear of mold plate 32. When mold plate 32 reaches its extended discharge, however, the notches 156 in the cams 155 are brought into alignment with the knockout rocker arms 149. Synchronism is maintained between cams 155 and mold plate 32 by the machine control.

At this point in the molding cycle, the two knockout rocker arms 149 are pulled rapidly downwardly by the springs 152, pivoting the two rocker arms in a clockwise direction. This movement of the rocker arms drives the knockout rods 147 downwardly, moving the knockout cups 33 through the mold cavities 126 to discharge molded food patties, from the mold plate 32. The discharged patties may be picked up by a conveyor 172 or may be accumulated in a stacker. If desired, the discharged patties may be interleaved with paper, by an appropriate paper interleaving device such as described in detail in U.S. Pat. No. 7,159,372, herein incorporated by reference or as heretofore known for the FORMAX® F-26™ patty-forming machine. In fact, machine 20 may be used with a wide variety of secondary equipment, including steak folders, bird rollers, and other such equipment.

Hydraulic Actuation System and Overall Sequence of Operation

Figure 13:
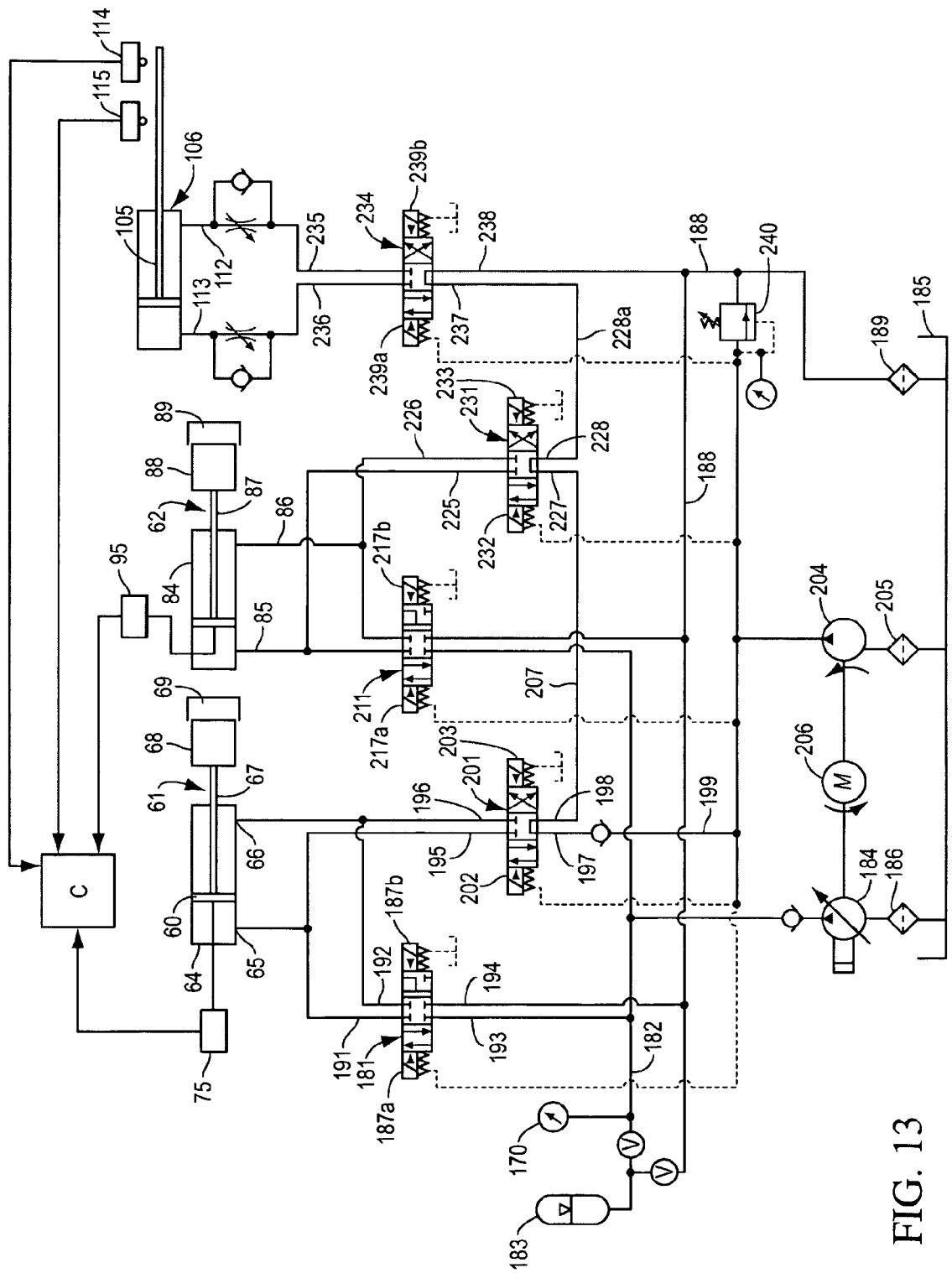
FIG. 13 is a schematic diagram of the hydraulic actuating system employed in operation of the patty molding machine.
Figure 13A:
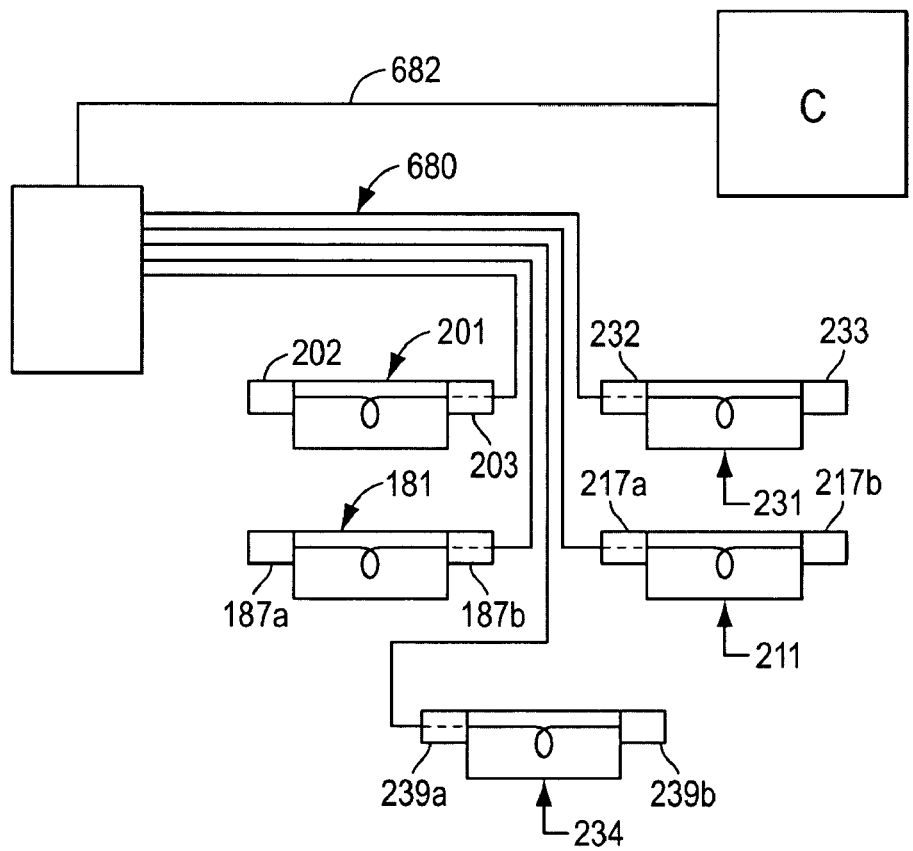
FIG. 13A is a signal schematic diagram corresponding to FIG. 13.

FIG. 13 illustrate a simplified operating hydraulic schematic of the apparatus of the invention. FIG. 13 affords a schematic illustration of a preferred form of hydraulic actuator system 180 for the food pumps and the manifold of patty molding machine 20; system 180 also provides a basis for description of a typical pump-manifold operating sequence. In system 180, port 65 of cylinder 64 in the first food pump 61 is connected to one port 191 of a three-position control valve 181. Port 66 of cylinder 64 is connected to a second port 192 of valve 181. A third port 193 of valve 181 is connected to a high pressure oil line 182 that is connected to an accumulator 183 and to a high-pressure hydraulic pump 184. Pump 184 draws hydraulic fluid from a tank 185 through an appropriate filter 186. Valve 181 is actuated by solenoids 187a, 187b. The remaining port 194 of valve 181 is connected to a drain line 188 that is returned to tank 185 through a filter 189.

Port 65 of pump cylinder 64 is also connected to one port 195 of a three-position control valve 201, with port 66 of cylinder 64 connected to a second port 196 of valve 201. Valve 201 is a three-position control valve actuated by two solenoids 202 and 203. It includes a third port 197 connected to a hydraulic line 199 that is fed from the outlet of a low pressure hydraulic pump 204 having an intake connected to tank 185 through a filter 205. The pumps 184 and 204 are driven by a single electric motor 206. The remaining port 198 of valve 201 is connected to a hydraulic line 207.

Figure 13C:
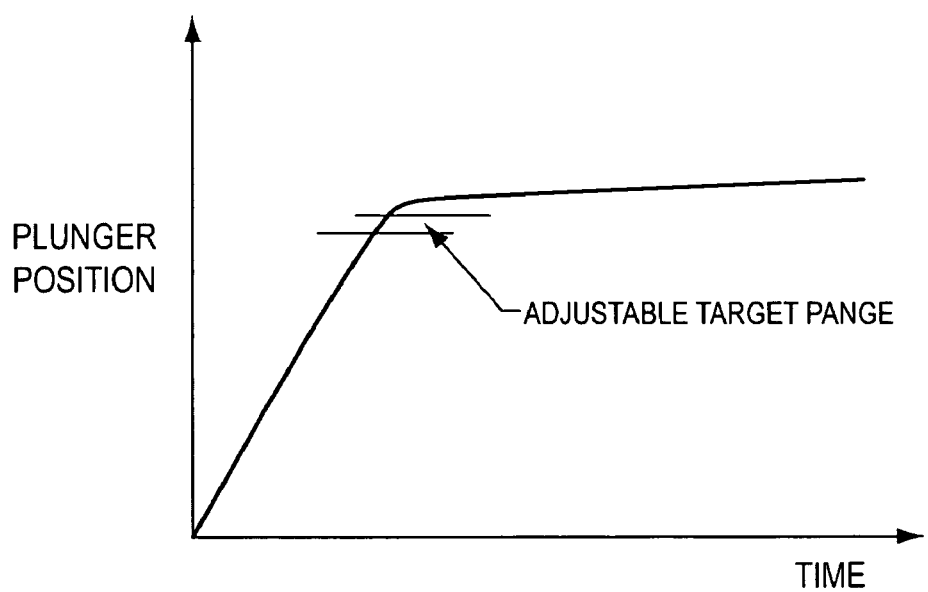
FIG. 13C is a diagram of plunger position versus time.
Figure 13B:
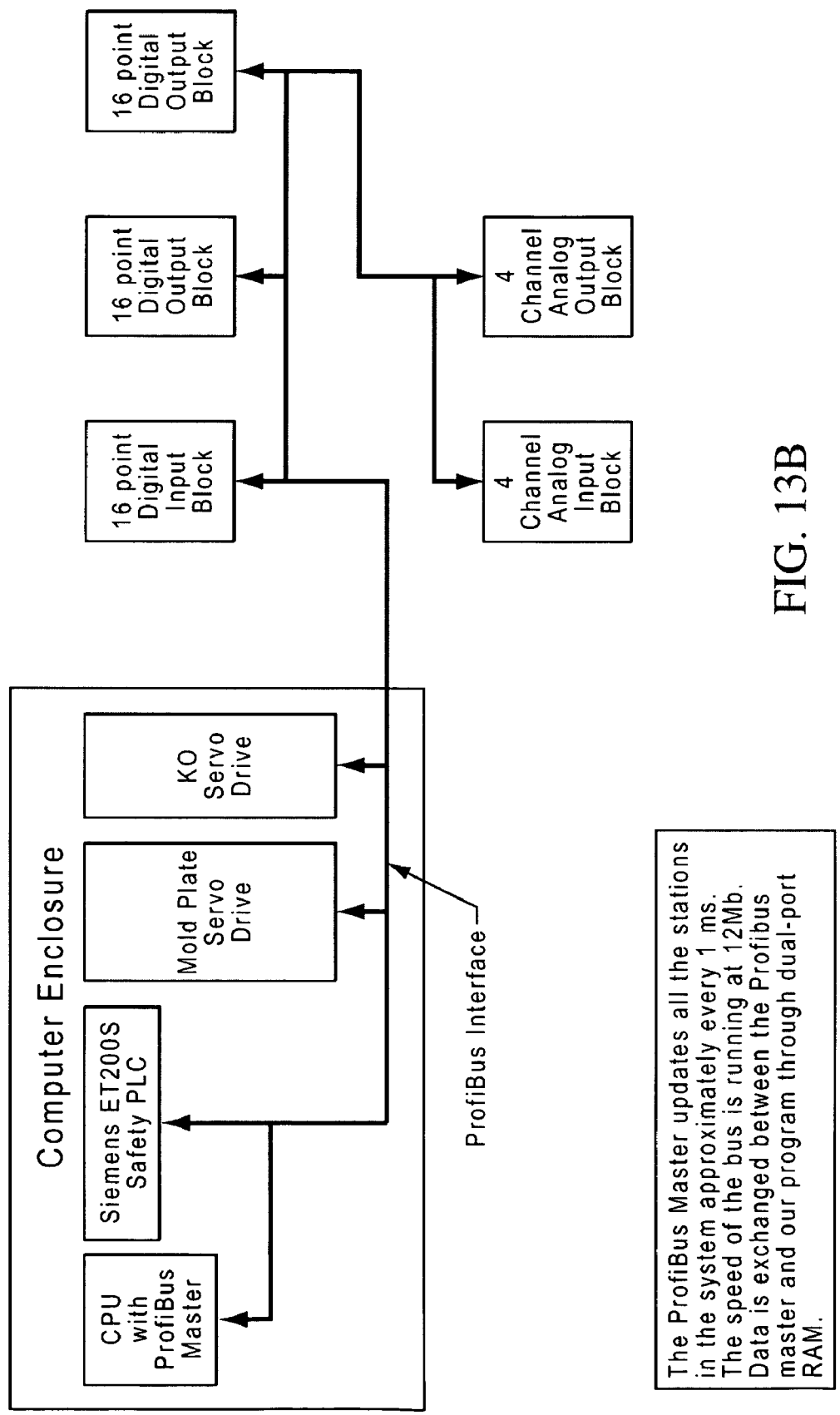
FIG. 13B is a signal schematic diagram corresponding to FIG. 13.
Figure 13D:
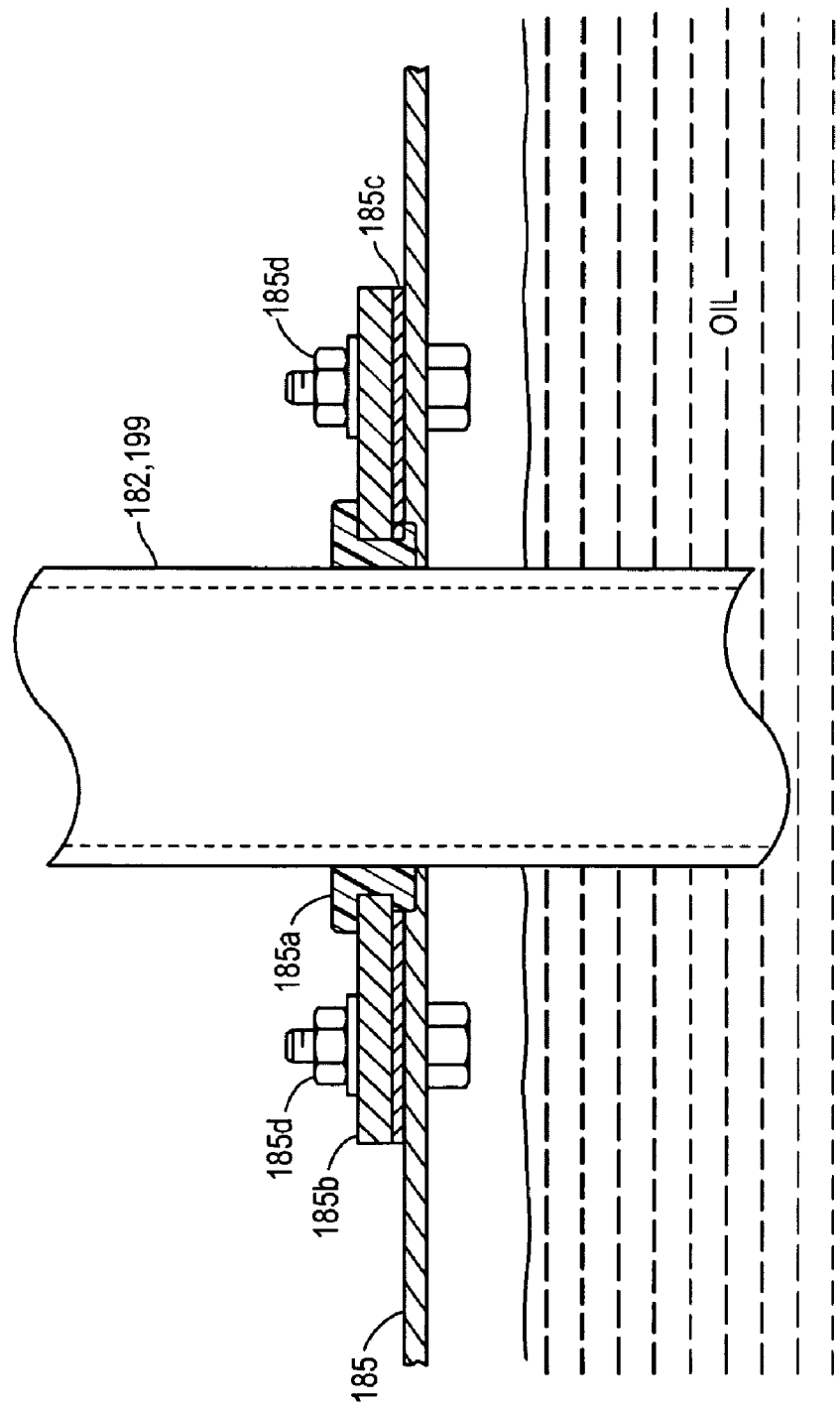
FIG. 13D is a cross-sectional view of hydraulic line and a hydraulic tank employed in operation of the patty molding machine.
Figure 31:
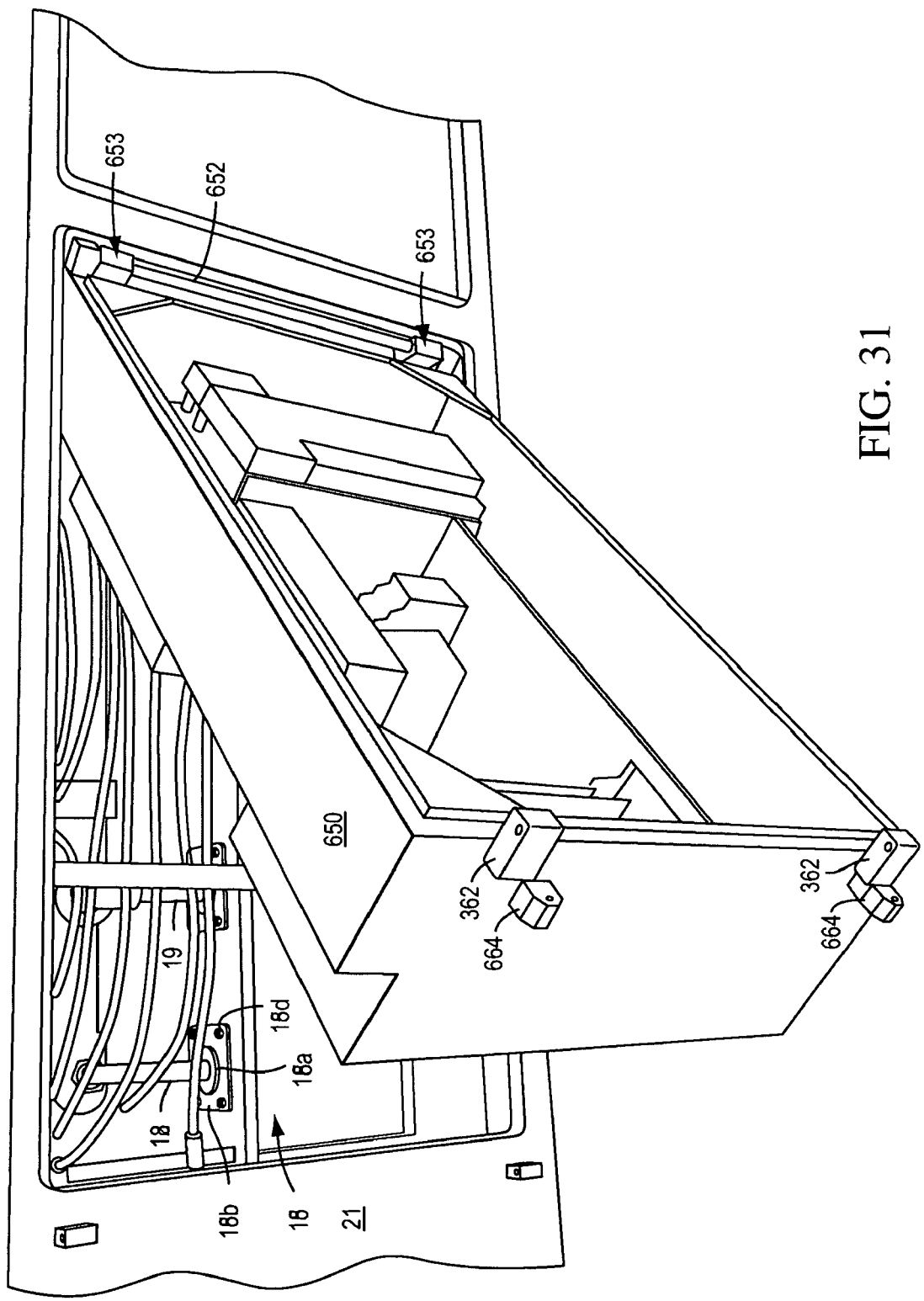
FIG. 31 is a fragmentary right side perspective view of the patty-forming machine.

Both the hydraulic lines 182, 199 connect to the tank 185 through a grommet 185a as shown in FIGS. 13D and 31. The grommet 185a is fitted into a hole in the plate 185b. The plate 185b is attached with four fasteners 185d to the tank 185. A gasket 185c is positioned between the plate 185b and the tank 185.

Preferably the tank is composed of stainless steel.

The controls for cylinder 84 of the second food material pump 62 are essentially identical to those of cylinder 64. Thus, port 85 of cylinder 84 is connected to one port 221 of a three-position control valve 211 actuated by solenoids 217a, 217b. Port 86 of cylinder 84 is connected to a second port 222 of valve 211. The third port 223 of valve 211 is connected to the high pressure hydraulic line 182 and the fourth port 224 of control valve 211 is connected to the drain line 188.

Port 85 of the second pump cylinder 84 is connected to the first port 225 of a three-position control valve 231. Port 86 of cylinder 84 is connected to a second port 226 of valve 231. The third port 227 of valve 231 is connected to line 207 and the fourth port 228 is connected to line 228a. Valve 231 is actuated by two solenoids 232 and 233.

Port 112 of the manifold actuator cylinder 106 is connected to one port 235 of a three-position control valve 234; port 113 of cylinder 106 is connected to a second port 236 of the same valve. The third port 237 of control valve 234 is connected to line 228a. The fourth port 238 of valve 234 is connected to drain line 188. Valve 234 is actuated by solenoids 239a, 239b. A pressure relief valve 240 may be connected between the low pressure hydraulic supply line 199 and the drain line 188.

In considering operation of patty molding machine 20, using the hydraulic actuation and control system 180 of FIG. 13, it may be assumed at the start that the two piston rods 67 and 87 are fully retracted with the plungers 68 and 88 in their respective cleaning positions, and that cylinder 106 is fully retracted. In these circumstances, motor 206 is energized; starting both high pressure pump 184 and low pressure pump 204. High pressure oil is accumulated in accumulators 183 and 241 and is supplied to port 112 of actuator cylinder 106.

After a limited period of time, sufficient to allow a build-up of an adequate volume of hydraulic fluid under pressure in the accumulator 183, the machine operator actuates a suitable electric control (not shown) to energize solenoids 202 and 232. This alters the porting arrangements for both of the valves 201 and 231, so that low pressure oil is supplied from line 199 to port 65 of cylinder 64, advancing piston rod 67 and plunger 68 a short distance until the linear displacement sensor 75 senses a retracted, ready position. At the same time, oil under low pressure is supplied, through line 207 and control valve 231, to port 85 of the second pump cylinder 84, which advances piston rod 87 and plunger 88 until the linear displacement sensor 95 senses a retracted position. The machine control C de-energizes solenoids 202 and 232, allowing control valves 201 and 231 to return to their initial operating conditions and interrupting the supply of fluid to the pump cylinder ports 65 and 85. The plungers 68 and 88 are stopped side-by-side in their respective ready positions, corresponding to the position of plunger 88 in FIG. 5, with the leading edge of each plunger just inside pump housing 71.

The machine operator next starts the sequential operation of machine 20 by actuating an appropriate electrical control to energize solenoid 202, again supplying low pressure fluid from line 199, through ports 197 and 195 of control valve 201, to port 65 of cylinder 64 in the first food pump 61. As a consequence, piston rod 67 and plunger 68 are advanced, pushing food material into the first pump cavity 69. After a short period of time, plunger 68 stalls against the food material trapped in cavity 69.

The linear position sensor 75 detects the presence of resistance in front of a plunger. The position of the resistance is not known. The plunger advances under constant force. The position of the plunger is constantly monitored and fed into a moving average filter of fixed time. The average of the positions in the filter will approach the actual position when resistance to movement is met, in other words, the plunger is slowing down. The control system will stop when the difference between the average position and the actual position is within a target range. The target range is adjustable as demonstrated by FIG. 13C.

When the presence of pressurized meat is sensed by the sensor 75 as set forth above, solenoid 187 is energized and solenoid 202 is de-energized. Control valve 201 returns to its original operating condition, cutting off the low-pressure fluid supply to port 65 of cylinder 64. However, control valve 181 is to connect the high pressure hydraulic fluid line 182 to port 65 of cylinder 64. Solenoid 239 of control valve 234 is energized. This reverses the inlet and drain connections for actuator cylinder 106, connecting port 113 to the high pressure line 182 and connecting port 112 to the drain line 188. Actuator cylinder 106 rapidly advances piston rod 105, conditioning manifold 27 to feed food material from the first pump cavity 69 to the molding mechanism 28. Plunger 68, under compression, forces food material through the aligned ports of manifold 27 and fills the manifold outlet passageway 111 with food material under relatively high pressure.

At the beginning of the fill portion of the mold plate cycle, control valve 181 is actuated to bring its left hand section into alignment with the hydraulic lines 191-194. This effectively connects pump 184 to cylinder 64 to apply the full pump pressure to port 65 of the cylinder, with port 66 connected to the system reservoir at atmospheric pressure. This causes cylinder 64 and piston 60 to actuate the food pump plunger 68 at the maximum fill pressure.

When the fill dwell interval ends and the mold plate begins to move toward its discharge position, valve 181 is actuated to shift the right hand portion of the valve into alignment with the hydraulic lines 191-194. This action connects the output of pump 184 to both of the ports 65 and 66 and establishes the conditions necessary for an intermediate pressure condition. This condition is maintained during the transition interval in which the mold cavities remain in communication with the fill passage. Upon completion of that time interval, valve 181 is returned to its normal position, blocking access of pump 184 to cylinder 64. This provides the "relieved" pressure condition desired for the balance of the mold plate cycle. The operation of valve 211 in controlling the application of the high pressure output from pump 184 to the second food pump cylinder 84 is the same.

Each time mold plate 32 comes into alignment with the manifold outlet passageway 111, filling mold cavities 126, as described in detail above, plunger 68 jogs forward by a short distance, pushing additional food material forwardly in cavity 69, into manifold 27, and into the cavities of the mold plate. In this manner, plunger 68 of food pump 61 jogs or "jumps" forwardly into cavity 69 each time the mold cavities are filled anew.

As plunger 68 moves into cavity 69, after several cycles of the molding mechanism, the linear displacement sensor 75 senses that plunger 68 is near the end of its stroke and that only a minimal amount of food material remains in cavity 69. The machine control energizes solenoid 232 to shift control valve 231 and apply low pressure fluid from line 199, through line 207, to port 85 in the second pump cylinder 84. As a consequence, plunger 88 is advanced, pushing food material into the second pump cavity 89. After a short time, plunger 88 stalls against the food material trapped in cavity 89.

The linear position sensor 95 detects the presence of resistance in front of a plunger. The position of the resistance is not known. The plunger advances under constant force. The position of the plunger is constantly monitored and fed into a moving average filter of fixed time. The average of the positions in the filter will approach the actual position when resistance to movement is met, in other words, the plunger is slowing down. The control system will stop when the difference between the average position and the actual position is within a target range. The target range is adjustable as demonstrated by FIG. 13C.

When the presence of pressurized meat is sensed by the sensor 95 as set forth above, solenoid 217 is energized to actuate control valve 211 and solenoid 232 is de-energized, permitting control valve 231 to return to its original operating condition. Under these circumstances, port 85 of pump cylinder 84 is connected to the high pressure line 182 and port 86 is connected to the drain line 188. Accordingly, the food material in cavity 89 is placed under high pressure.

At this point, the sensors 75, 95 signal to the machine control for actuation of manifold 27 to its alternate operating condition to feed molding mechanism 28 from the second pump cavity 89. Solenoid 239 is de-energized, allowing valve 234 to return to its original operating condition, with oil supplied under pressure to port 112 of actuator cylinder 106 and with port 113 connected to drain line 188. Consequently, piston rod 106 is rapidly retracted and the manifold valve cylinder 101 is rotated to the alternate manifold operating condition. Food material can now be pushed into the mold plate cavities by plunger 88 moving into cavity 89.

When the changeover of manifold 27 has been completed, by rotation of valve cylinder 101, the outlet slot 73 from pump cavity 69 is blocked. Accordingly, plunger 68 can now be retracted to obtain a new supply of material. The completion of changeover operation in the position of the manifold valve cylinder is signaled by tripping of limit switch 115; actuation of switch 115 de-energizes solenoid 187 and permits control valve 181 to return to its original position. This disconnects the high pressure supply line 182 from port 65 of cylinder 64 in the first food pump 61. Solenoid 203 is energized, shifting control valve 201 to its third operating position and connecting the low pressure supply line 199 to port 66 of cylinder 64 while port 65 is connected to drain line 188 through line 207. This retracts the piston in cylinder 64 and hence retracts piston rod 67 and plunger 68 from the pump cavity 69. Retraction of plunger 68 continues until the linear displacement sensor 75 plunger 68 has reached its ready position, just within housing 71, allowing an additional supply of food material to be fed into pump 61 by feed screw 52 and 53, which are actuated while plunger 68 retracts.

Plunger 68 remains in its ready position until plunger 88 advances by jogging or jumping to a point near the end of its travel into pump cavity 89. When plunger 88 has moved far enough for linear displacement sensor 95 to sense a nearly depleted meat position, solenoid 202 is energized. With solenoid 202 energized, control valve 201 is positioned to supply oil from the low pressure line 199 to port 65 of pump cylinder 64, advancing plunger 68 to push a fresh supply of food material into pump cavity 69. Plunger 68 stalls against the material trapped in cavity 69, and solenoid 202 is de-energized to cut off the low pressure oil supply to cylinder 64. Signals from the two sensors 75, 95 to the machine control C causes solenoid 239 to again be energized to reverse the valve connections for cylinder 106, supplying high pressure oil to port 113 and connecting port 112 to drain line 188. Accordingly, piston rod 105 is again advanced and rotates valve cylinder 101 to change manifold 27 back. Accordingly, food material can now again be forced into the mold plate cavities, through manifold 27, by pump 61.

The changeover in manifold 27 to pump 61 again blocks the slot 93 from pump cavity 89, so that the second food pump 62 can be re-charged with food material. The changeover of the pump manifold trips sensing switch 114, which actuates an appropriate electrical control circuit to de-energize solenoid 217, allowing control valve 211 to return to its original operating condition and cutting off the high pressure oil supply to pump cylinder 84. Solenoid 233 is again energized, and control valve 231 is actuated to its third operating condition. Under these circumstances, low pressure oil is supplied through lines 199 and 207 to port 86 of cylinder 84 while port 85 is connected to drain line 188. Accordingly, plunger 88 is retracted to its ready position, solenoid 233 is de-energized and valve 231 returns to its original position, the movement of plunger 88 being halted with the plunger in its ready position as shown in FIG. 5 so that a new supply of food material can be fed directly into pump cavity 89 by feed screws 51 and 52 (see FIG. 5).

Plunger 88 waits in its ready position until plunger 68 jogs or jumps ahead to the point near the end of its travel. Solenoid 232 is energized to begin a slow advance of plunger 88, thus initiating the next changeover to the second food pump 62. Operation continues in this manner, with pumps 61 and 62 working in overlapping alternation, as long as an output is desired from molding machine 20 and a continuing supply of food material is maintained in hopper 25.

Because the linear displacement sensors 75, 95 are so accurate, one aspect of the invention provides a control of the hydraulic pressure in the cylinders 64, 84 based on volume of the mold cavities and the volume of the plunger "jog." When the plunger 68, 88 moves forward during a fill cycle, the linear displacement sensor very precisely monitors the movement of the plunger. Given the known cross-sectional area of the pump chambers 69, 89, a volume of food product displaced is determinable by the machine control C. The volume of the patty cavities is also known precisely. Given that some food product is substantially incompressible, such as ground beef, if the volume of the patty cavities is greater than the volume of the plunger displacement within the pump chambers 69, 89 then some volume of the patty cavities remains empty.

According to the invention, the machine control could calculate this shortfall and increase the hydraulic cylinder pressure to ensure that a substantially equal amount of food product is pumped from the pump chamber into the patty cavities.

Figure 9:
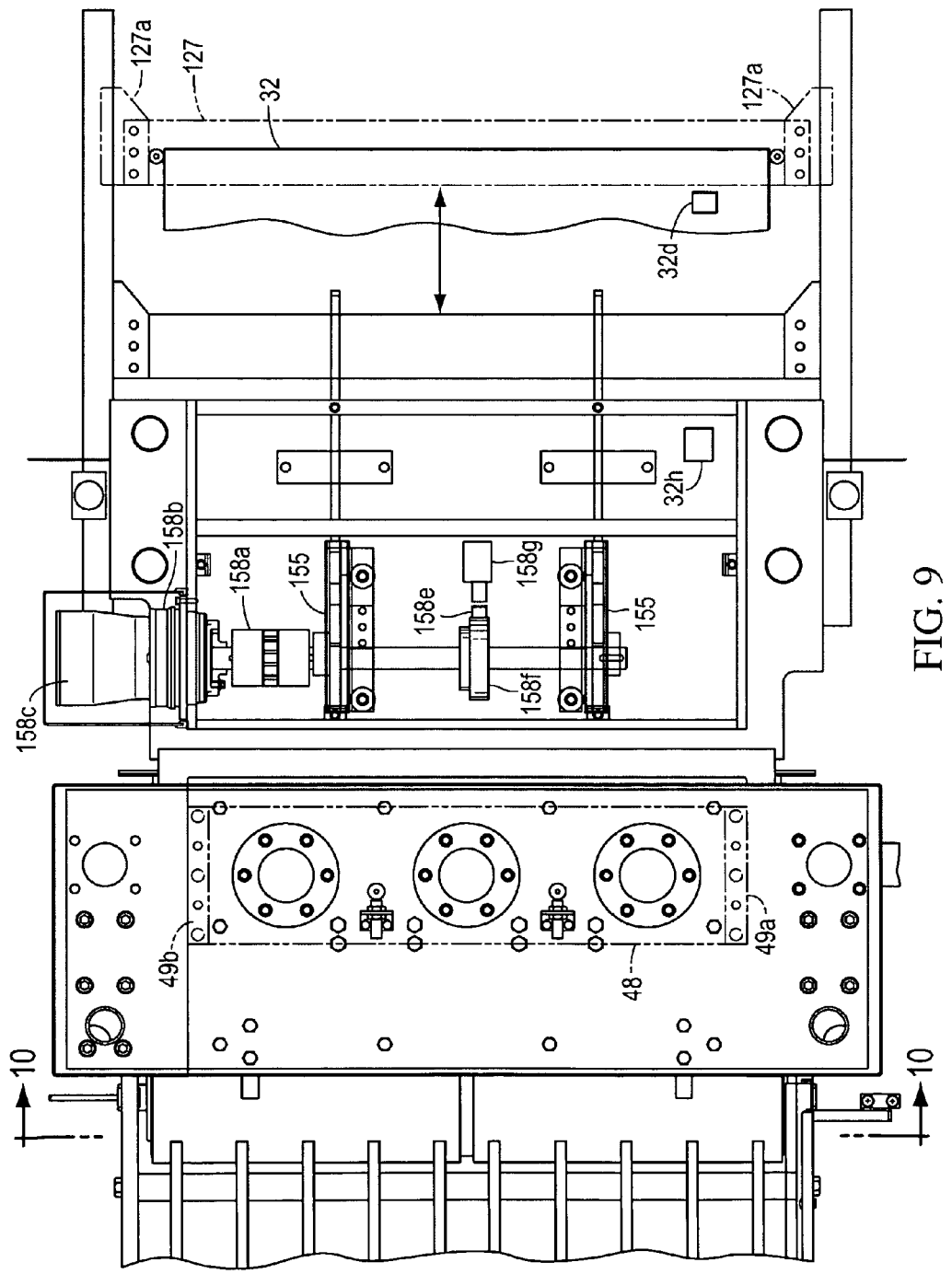
FIG. 9 is a fragmentary plan view, partly in cross section, of the molding mechanism.
Figure 9A:
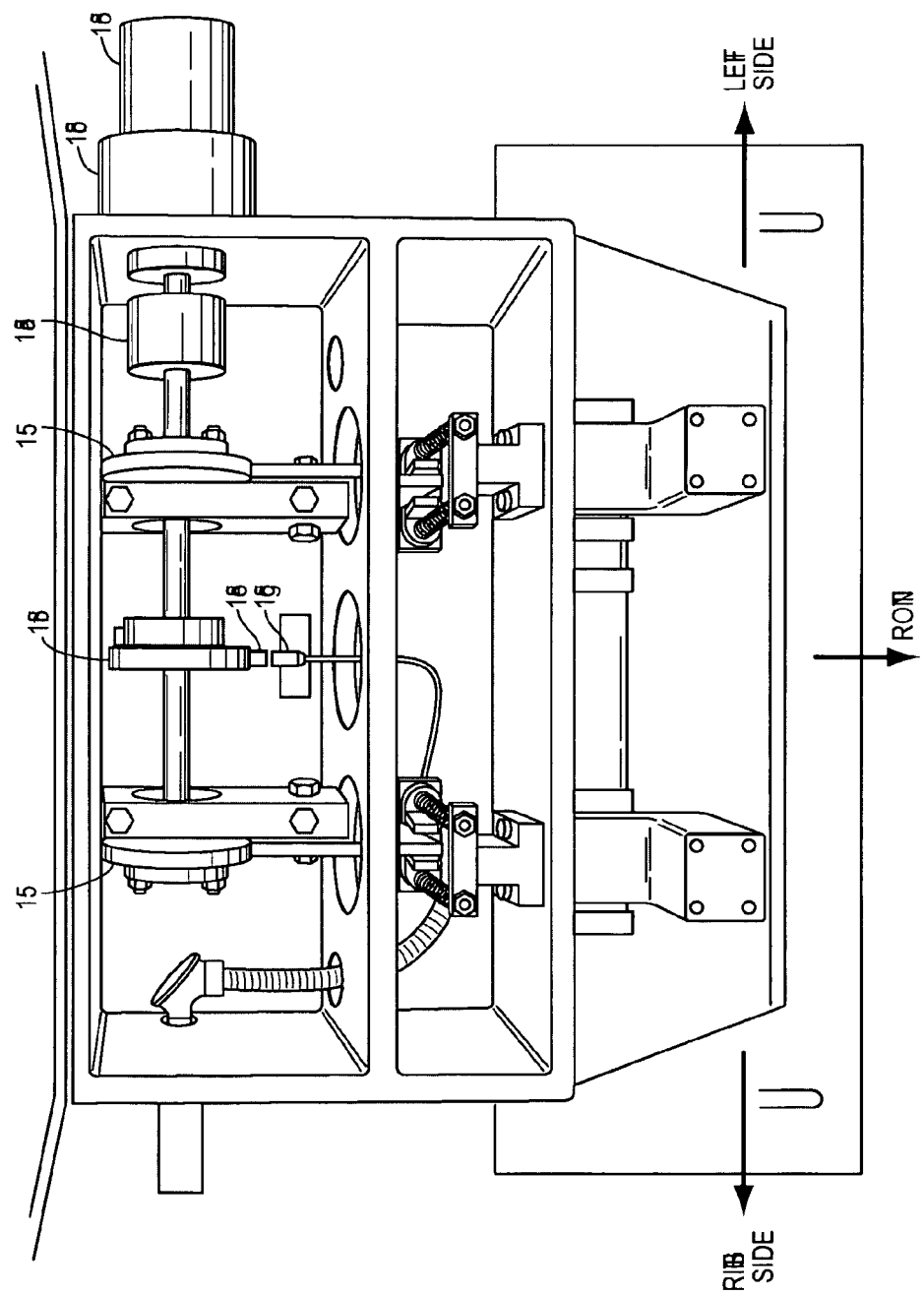
FIG. 9A is a fragmentary plan view of the knockout apparatus of the invention.
Figure 9B:
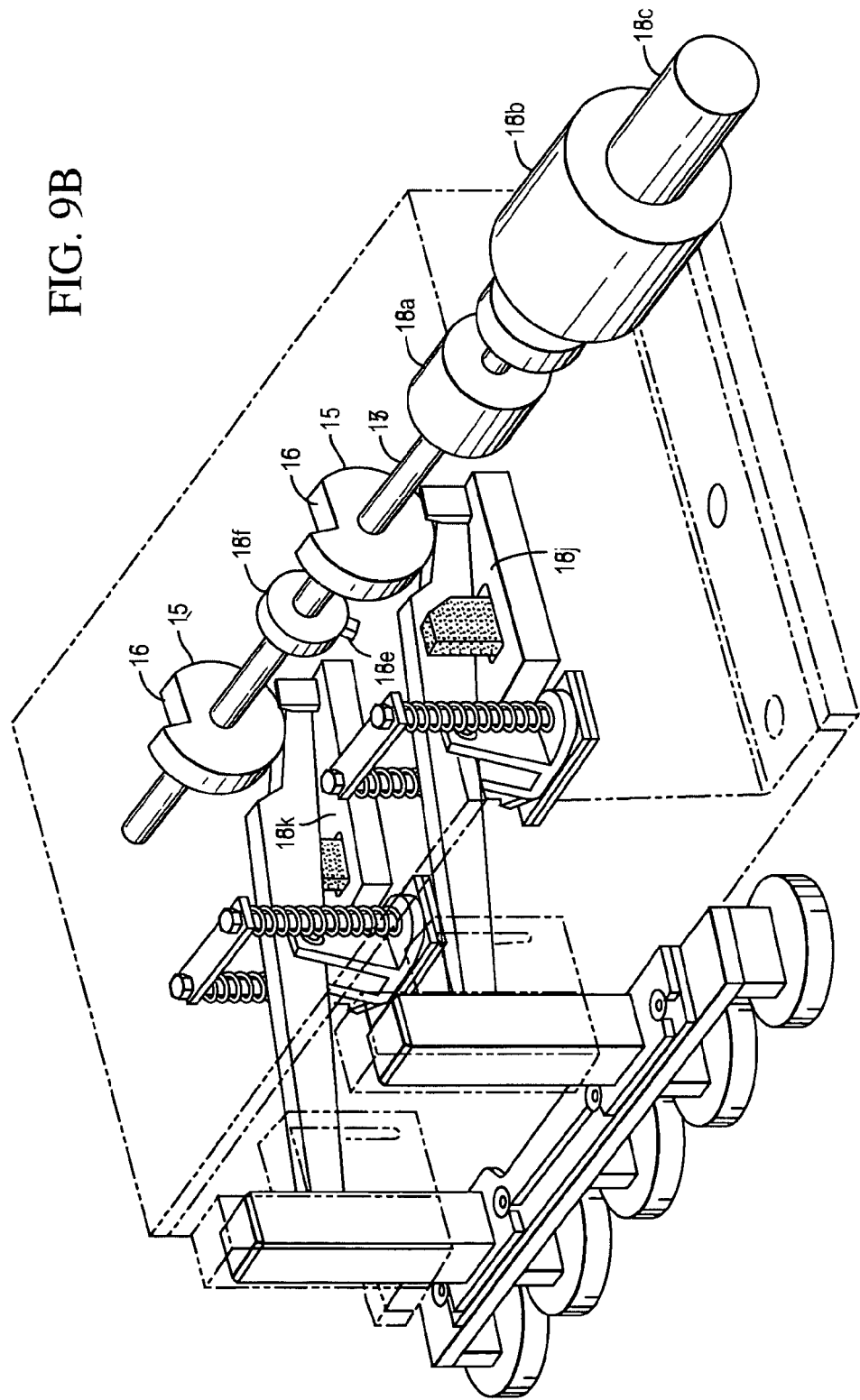
FIG. 9B is a perspective view of the knockout apparatus of the invention.

As another aspect of the invention, shown in FIG. 9, mold plates 32 for use in the patty-forming apparatus 20 are tagged with a radio frequency identification (RFID) chip 32d or other integrated circuit, barcode or other machine readable information source. The chip 32d would provide information which would be read by a sensor 32h within the apparatus 20. Depending on the application, the chip would inform machine control C the volume of the patty cavities 126 within the mold plate 32 and perhaps initial hydraulic pressure, or recommended hydraulic pressure profiles over the mold cycle depending on the food product being molded. Also the chip could inform machine control C of any recommended mold plate or knockout movement profiles depending on the product being molded.

Improved Hygiene Features

The apparatus of the present invention provides many improved hygienic features; particularly improved seals between mechanical compartments and food or spray wash exposed areas.

Figure 20:
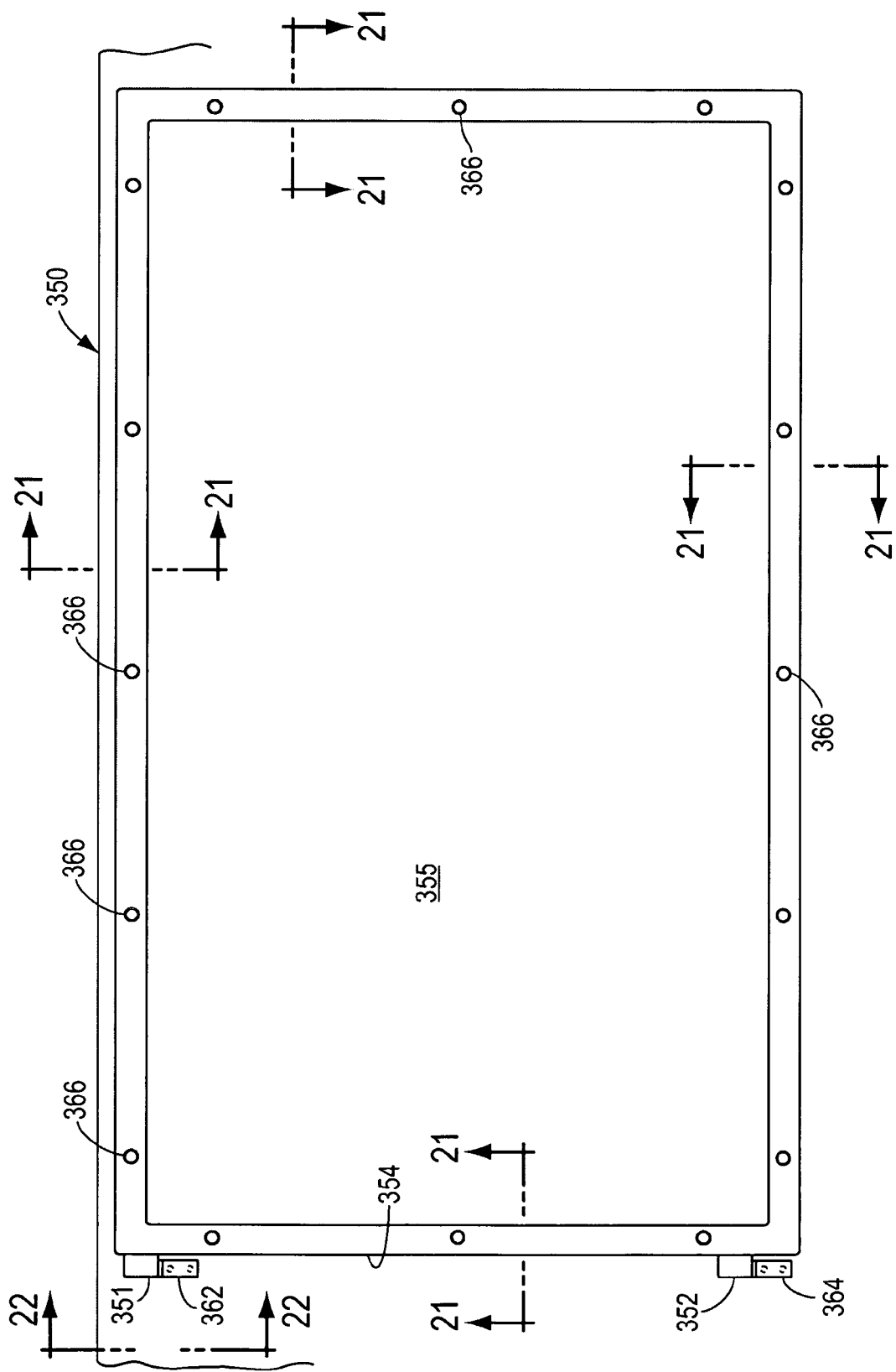
FIG. 20 is a right side elevation view of an access door of the base of the patty-forming machine of the present invention.

As illustrated in FIGS. 20-21 the base 21 of the apparatus includes double sealed enclosure doors. A door 350 incorporates two rugged hinges 351, 352 that are fastened to the edge 354 of the door panel 355. Each hinge 351, 352 includes a downwardly directed pin 356 that fits into a cylindrical socket 360 formed in a hinge post 362, 364 secured to the base 21;

such as to the skin 21a or to the frame 21b or to another sturdy part of the apparatus. Furthermore, the door panel 355 is fastened to the base 21 around a perimeter of the door panel 355 by fasteners 366. A raised flange 370 that defines the door opening holds a first continuous seal 368 all-around the flange 370. A second continuous seal 374 having an extending lip 375 (FIG. 21B) is fit within an inside channel 376 provided around the door edge 354. The extending lip 375 flexes when compressed against the skin 21a to form an effective, leak resistant seal. The seals 368, 374 are preferably composed of 40-50 DURO White FDA approved NEOPRENE.

The double seal arrangement is used on all of the cabinet doors including the feed screw drives top lid.

Figure 23:
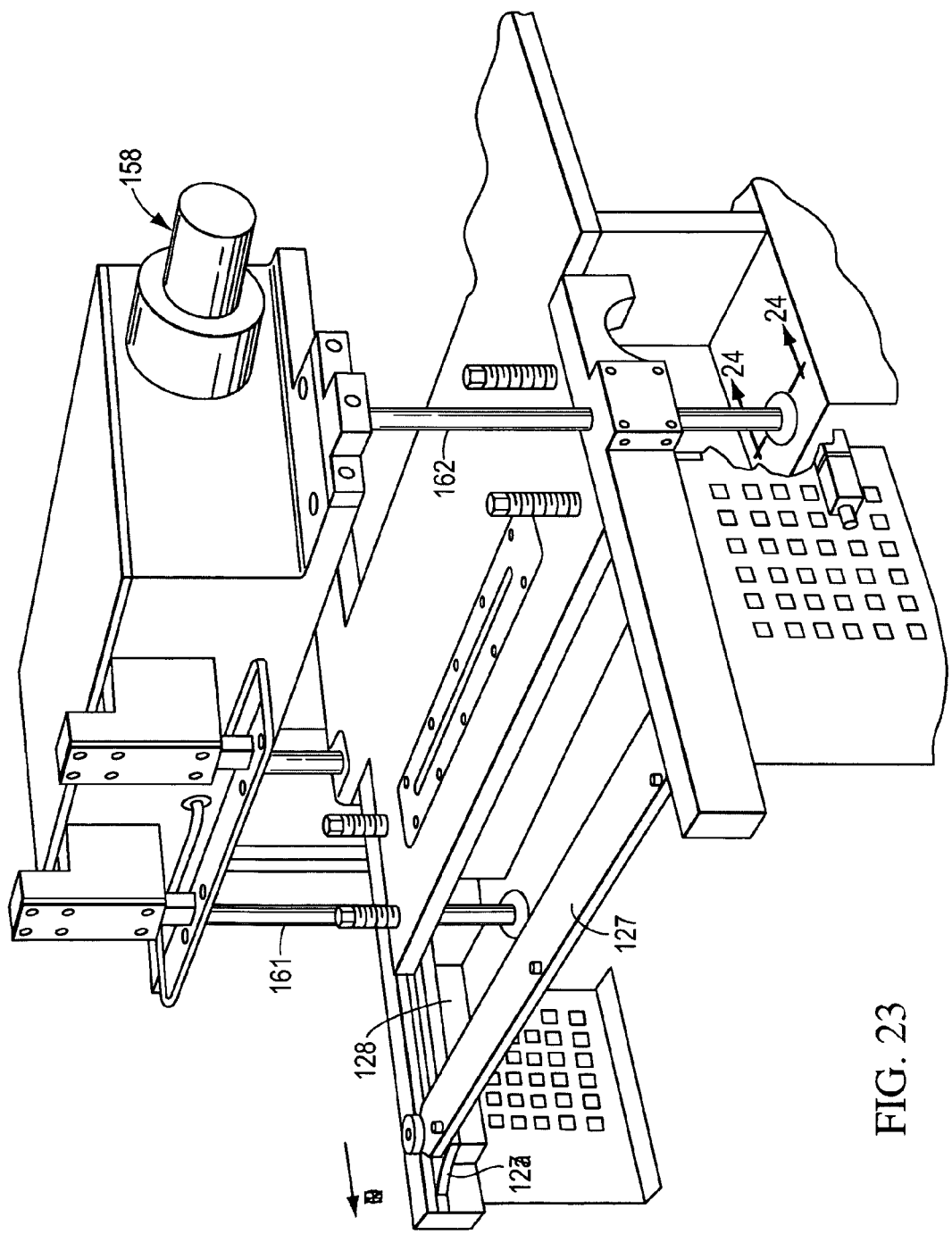
FIG. 23 is a fragmentary perspective view at a front portion of the patty molding machine of the invention with the mold cover lifted in a maintenance position, with mold plate removed.
Figure 25:
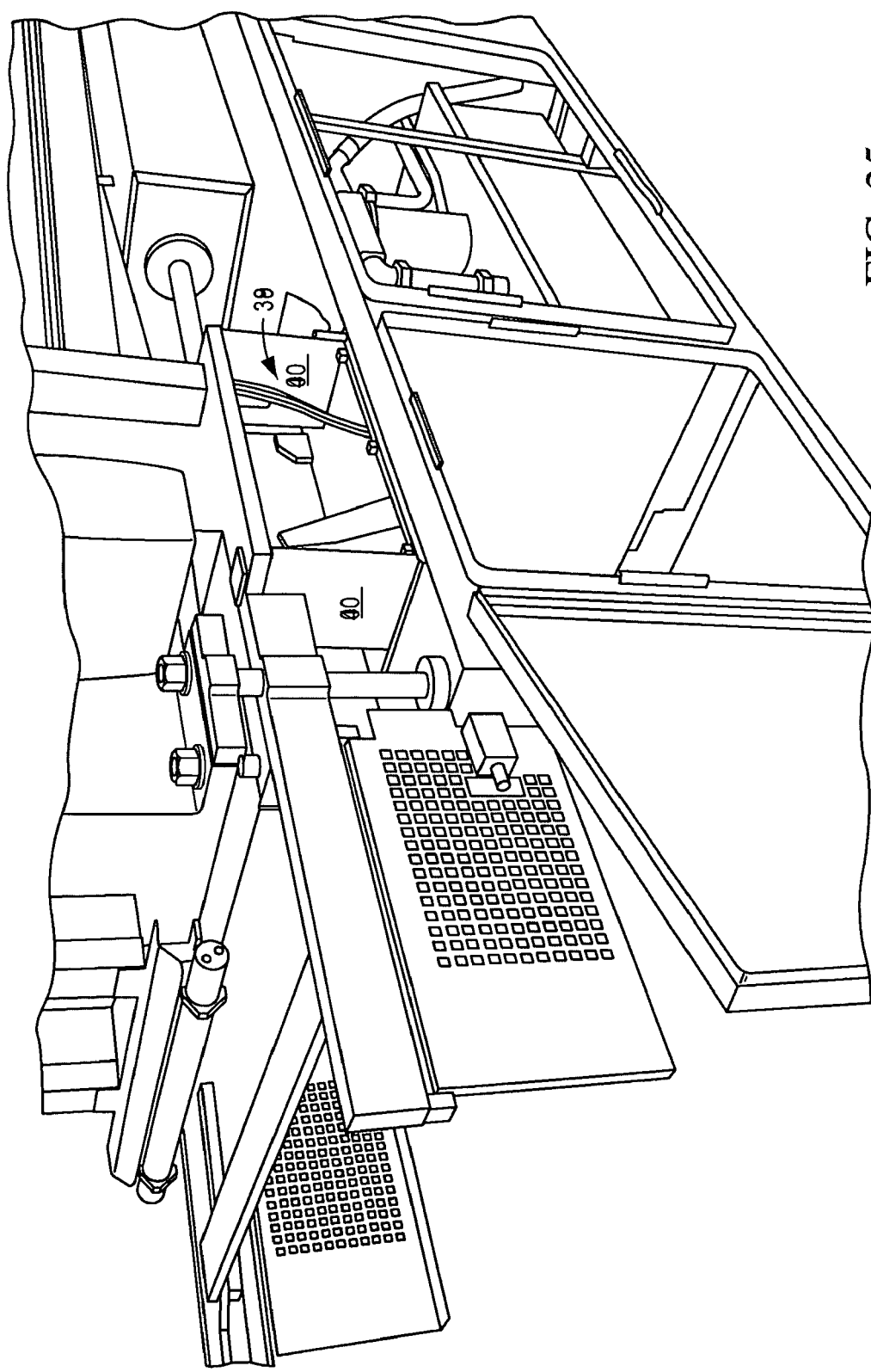
FIG. 25 is a fragmentary front perspective view of a portion of the patty-forming machine.
Figure 26:
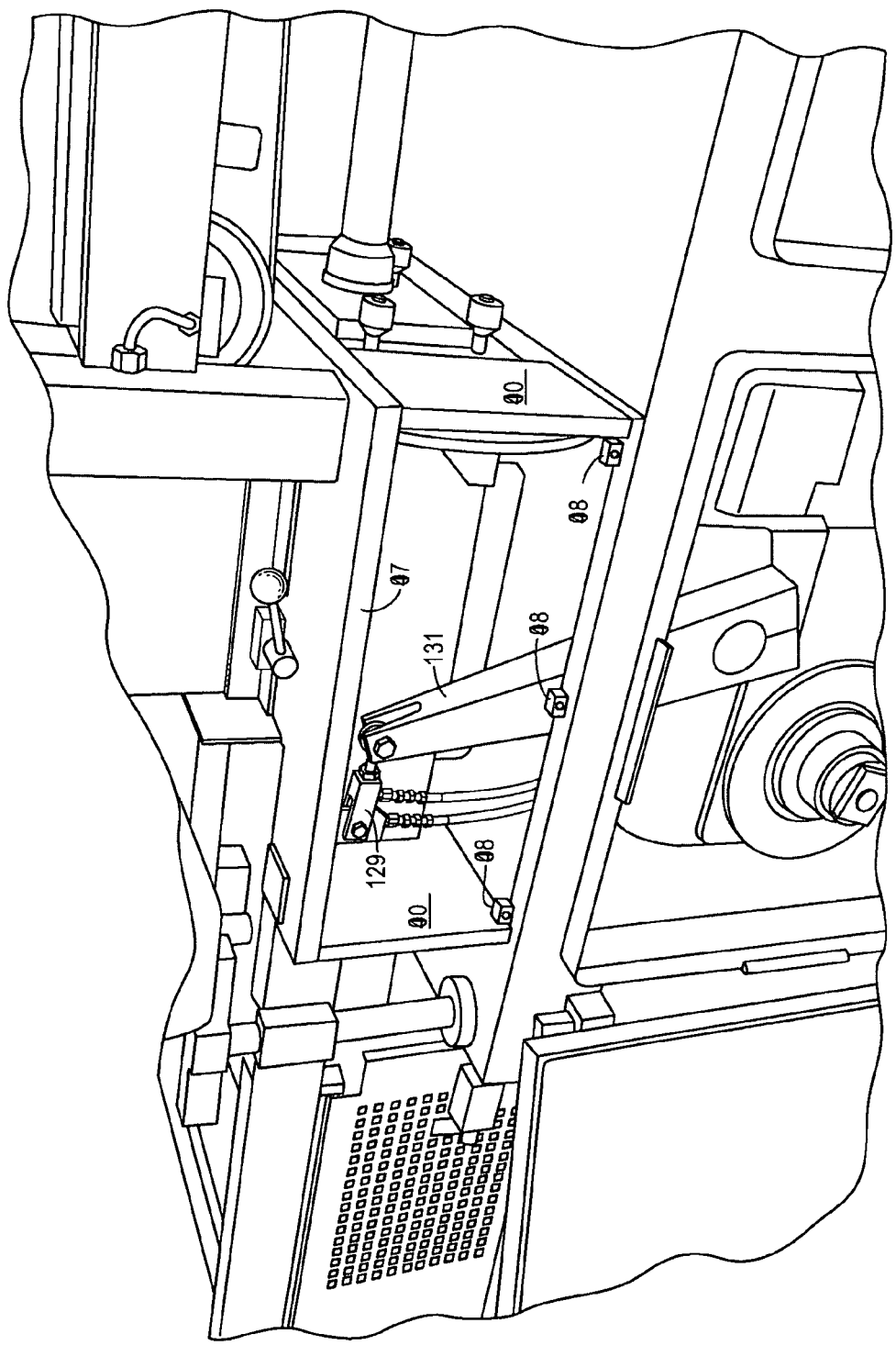
FIG. 26 is a fragmentary left side perspective view of a portion of the patty-forming machine.
Figure 27:
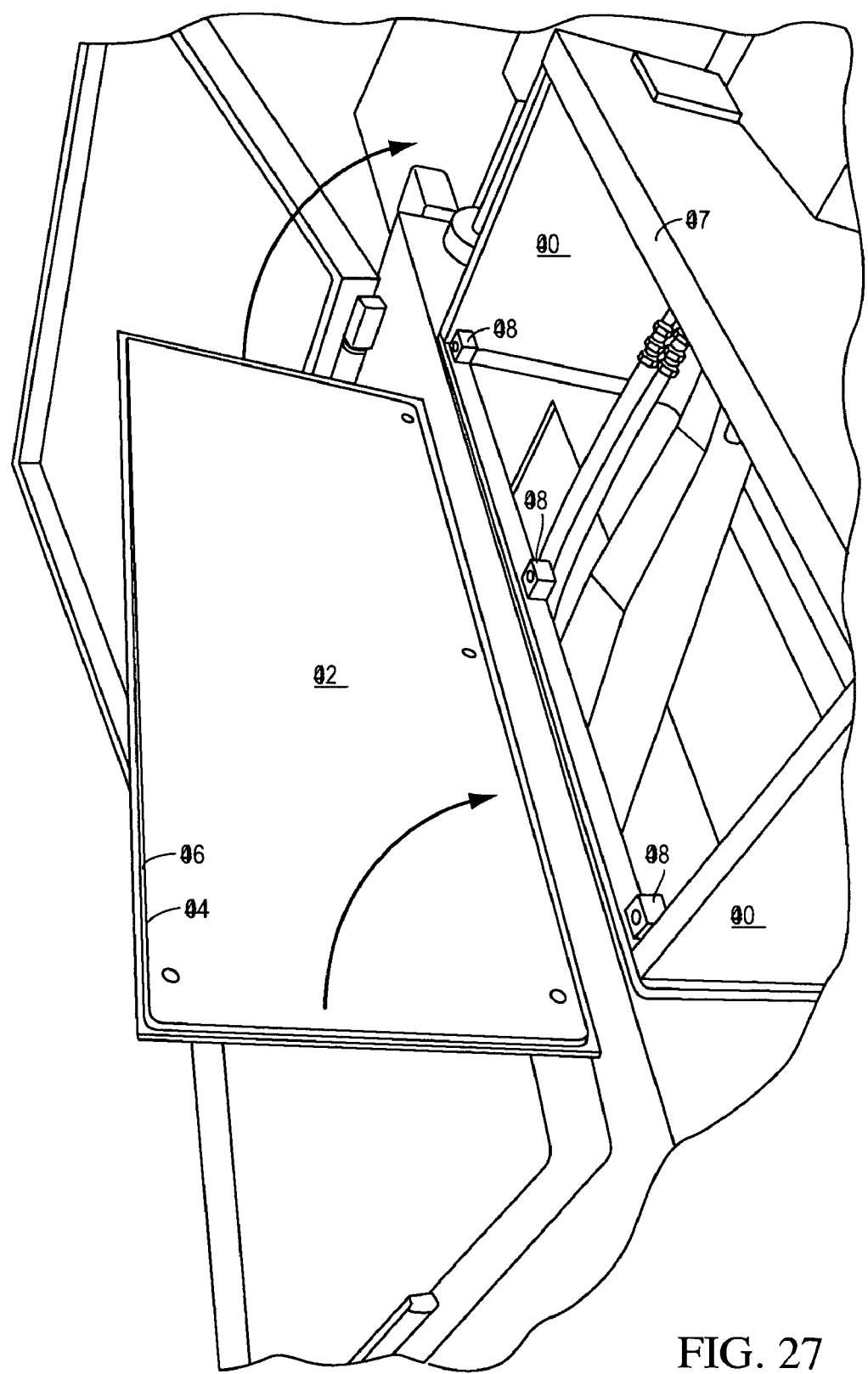
FIG. 27 is a fragmentary left side perspective view of the portion shown in FIG. 26 and a further stage of assembly.
Figure 28:
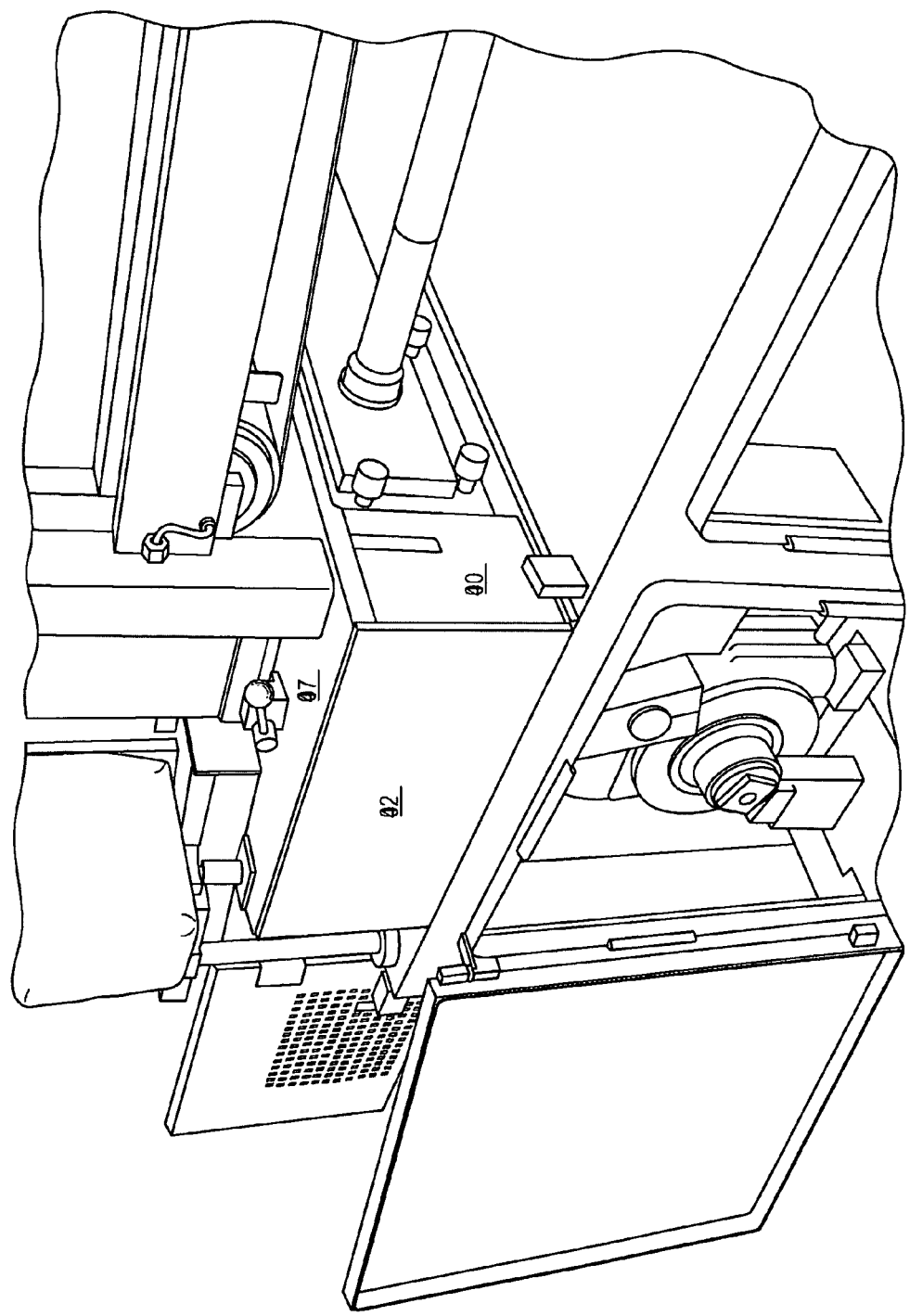
FIG. 28 is a fragmentary left side perspective view of the portion shown in FIG. 27 in a further stage of assembly.

According to another aspect of the invention, as illustrated in FIGS. 23 and 24, the lift rods 161, 162 are cylindrical in cross-section and are sealed to the base 21 using an annular seal member 380 that comprises a first member 381 above the base and a second member 382 below the base fastened to the first member 381 through the skin 21a. At least one of the member 381, 382 includes an internal o-ring seal 386. The use of a commercially available cylindrical seal, using a circular o-ring, rather than the heretofore known rectangular cross-section seal, makes for a more cost effective and performance effective seal.

The o-ring is preferably composed of BUNA or VITON.

Another improvement in the hygienic configuration of the patty-forming machine 20 is the fact that the heretofore known trip rods that were attached to the plungers 68, 88 have been replaced by the linear displacement sensors 75, 95 described above. The linear displacement sensors 75, 95 do not extend outside of the base 21 or penetrate the skin 21a.

As shown in FIGS. 32 and 33, removable stainless steel floor panels or skins 560, 562 are guided like drawers on ledges 566 mounted to the bottom of the machine frame 21b. The skins 560, 562 are slid inward to operating position from the left and right sides of the apparatus and then fastened to a lower frame member. Once unfastened, the skins can be pulled out using handles 565. When the skins 560, 562 are pulled out, the base 21 interior is bottomless and can be spray cleaned more easily. The skins 560, 562 can also be spray cleaned more easily once removed. The skins 560, 562 have outside flanges 560a, 562a for fastening to the frame 21b and to mount the handles 565, and a surrounding flange 560b, 562b either upwardly or downwardly directed for rigidity.

Figure 30:
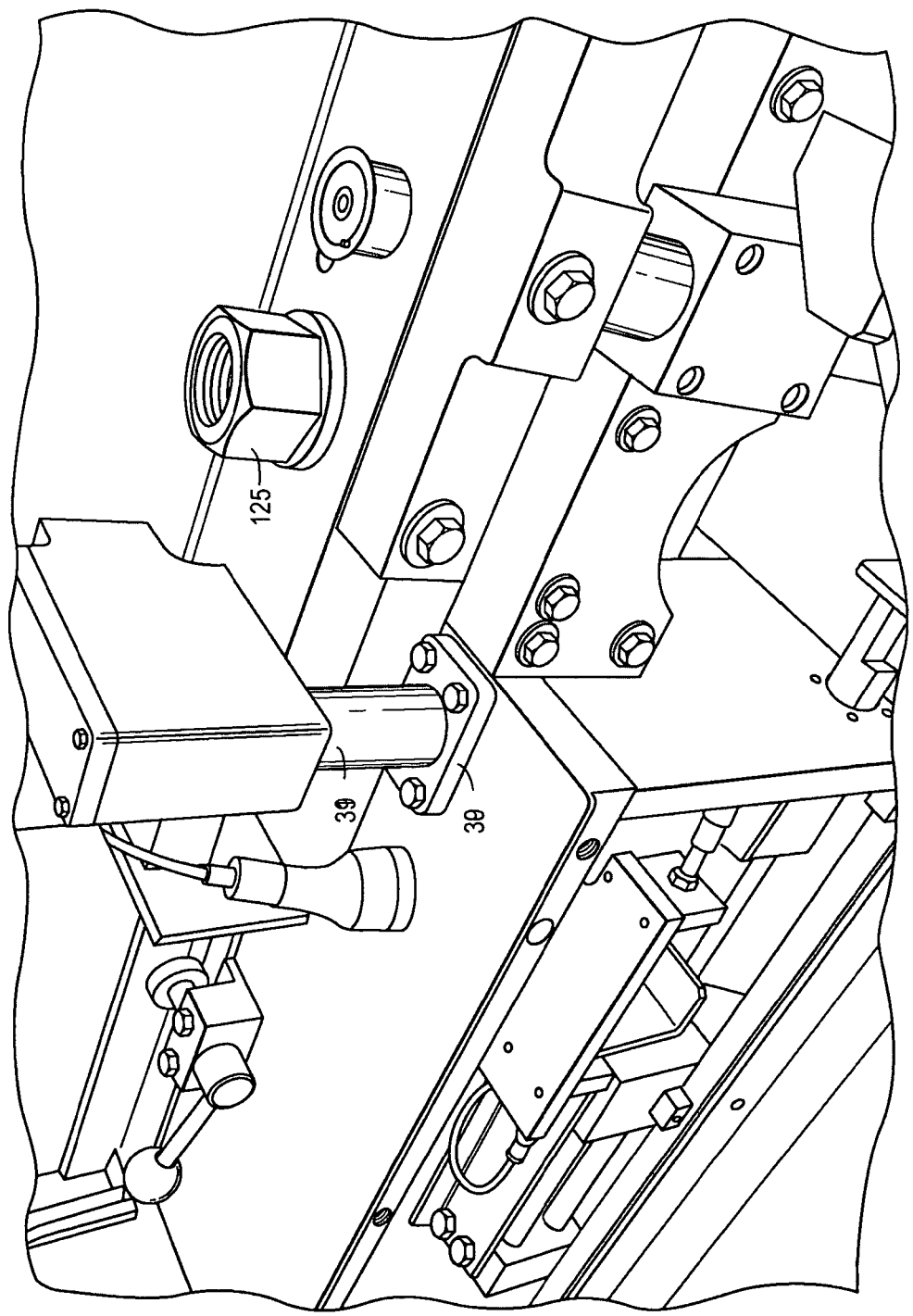
FIG. 30 is a fragmentary right side perspective view of a portion of the patty-forming machine.

As illustrated in FIG. 30, a rectangular plastic seal 390 is now used to seal the mold cover wiring tube 391 which must move vertically when the mold cover is lifted. The seal 390 can also include an internal o-ring like the seal member 380.

Figure 29:
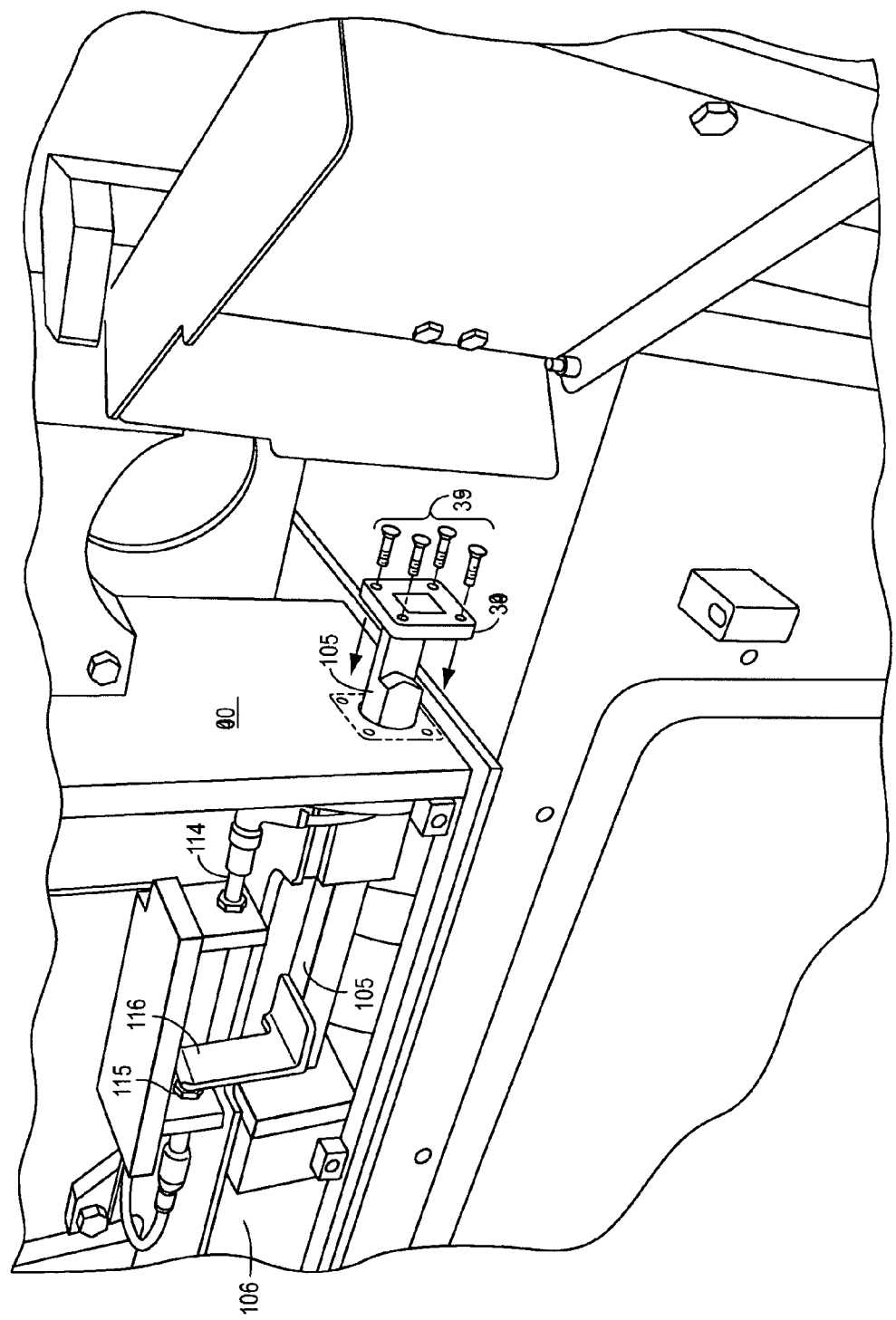
FIG. 29 is a fragmentary right side perspective view of a portion of the patty-forming machine.

As illustrated in FIG. 29 the rectangular control rod 105 of the tube valve control hydraulic cylinder 106 passes through the sidewall 400. A replace-able rectangular plastic seal 394 is slid over the control rod 105 and fastened against the sidewall 400 using fasteners 395. The seal 394 can also include an internal o-ring like the seal member 380 if necessary.

As illustrated in FIGS. 25-30, the side compartments 398 which expose the swing links 129, and the tube valve control cylinder 106 (on the right side) when opened, have been redesigned. The side compartments include white plastic sidewalls 400. The sidewalls can be composed of white DELRIN. A stainless steel cover plate 402 has a peripheral groove 404 that holds a surrounding o-ring 406. The o-ring is preferably composed of BUNA or VITON. The cover plate 402 is fastened to the sidewalls 400, to an edge of a top wall 407 and to lugs 408 of the base 21.

Air Cooling System

Figure 4A:
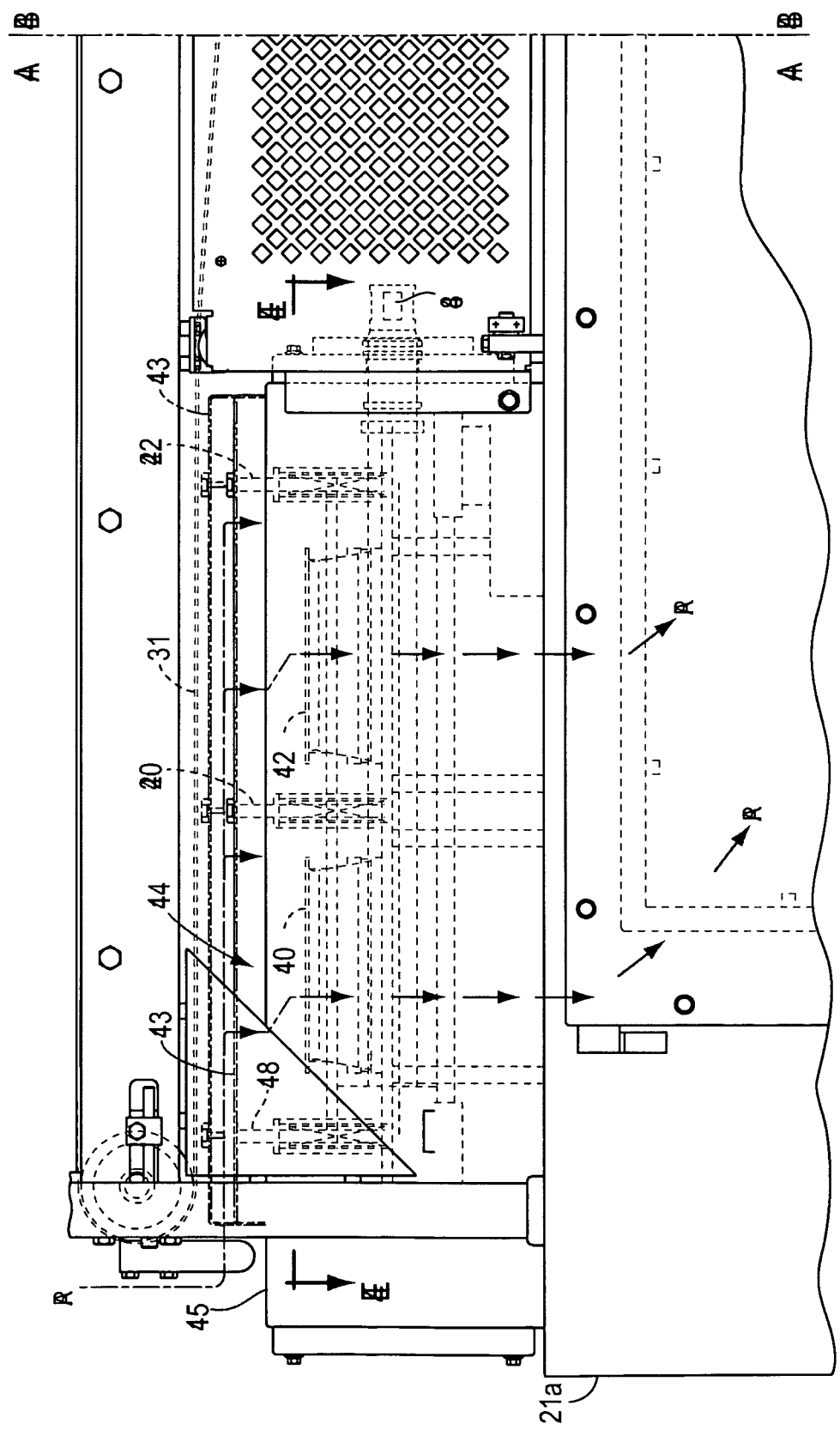
FIG. 4A is an enlarged sectional view of the pumping apparatus for the food patty molding machine, taken approximately along line 4-4 of FIG. 3.
Figure 4B:
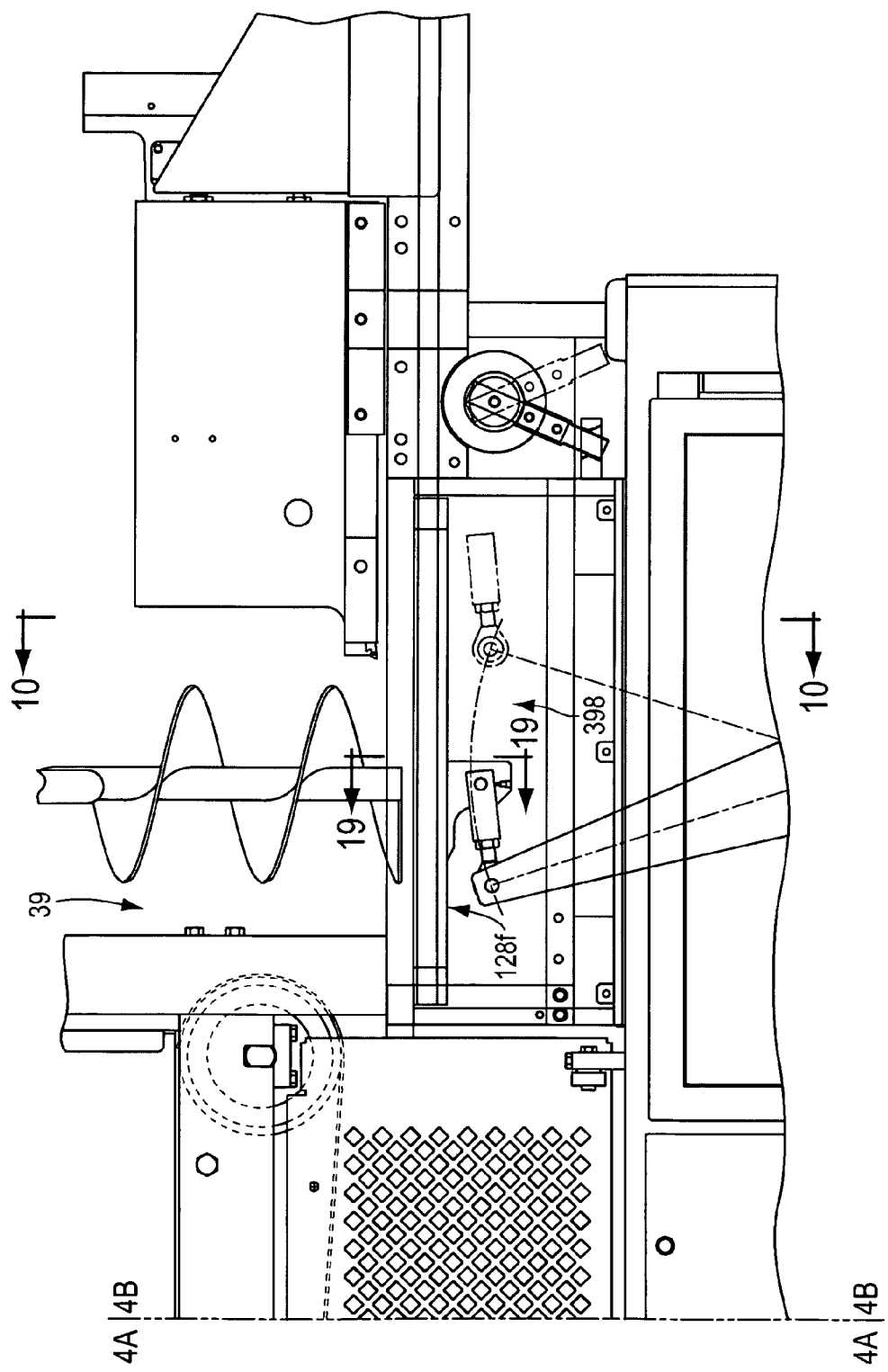
FIG. 4B is an enlarged sectional view of the molding apparatus for the food patty molding machine, taken approximately along line 4-4 of FIG. 3, and is a continuation of FIG. 4A.
Figure 4C:
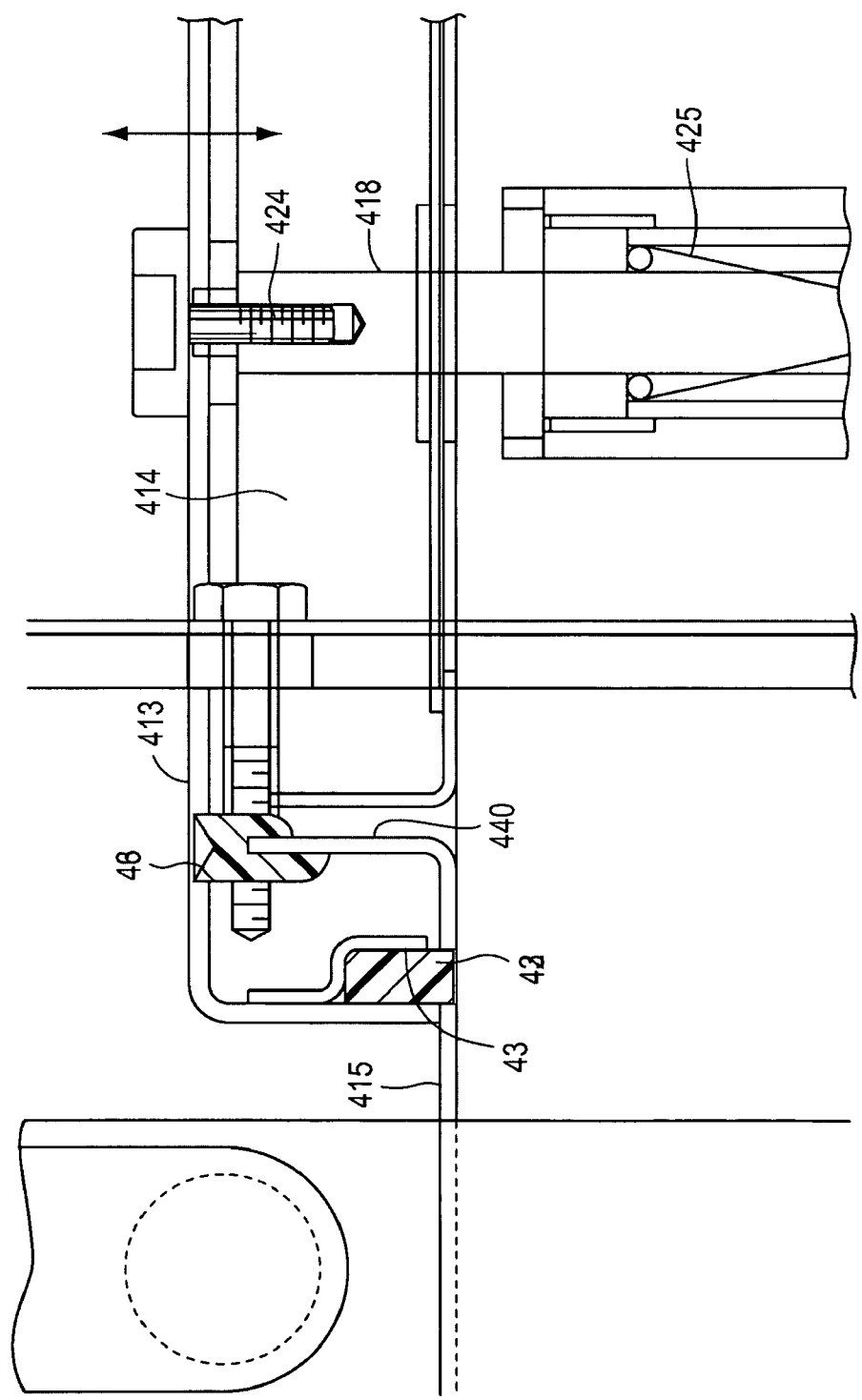
FIG. 4C is an enlarged, fragmentary sectional view taken from FIG. 4A.

As a further improvement, as shown in FIG. 4A and FIG. 4C, the base 21 includes cooling fans 410, 412 that draw outside air through an opening between an inlet damper 413 and a top 415 of the surrounding skin 21a, and through a filter 414 and into the base 21. The cooling fans are mounted to a baffle plate 423. In one embodiment, as shown in FIG. 4A and FIG. 4D, the cooling fans 410, 412 are located within the base 21 below the conveyor belt 13 and between the hydraulic cylinders 64, 84.

Figure 4D:
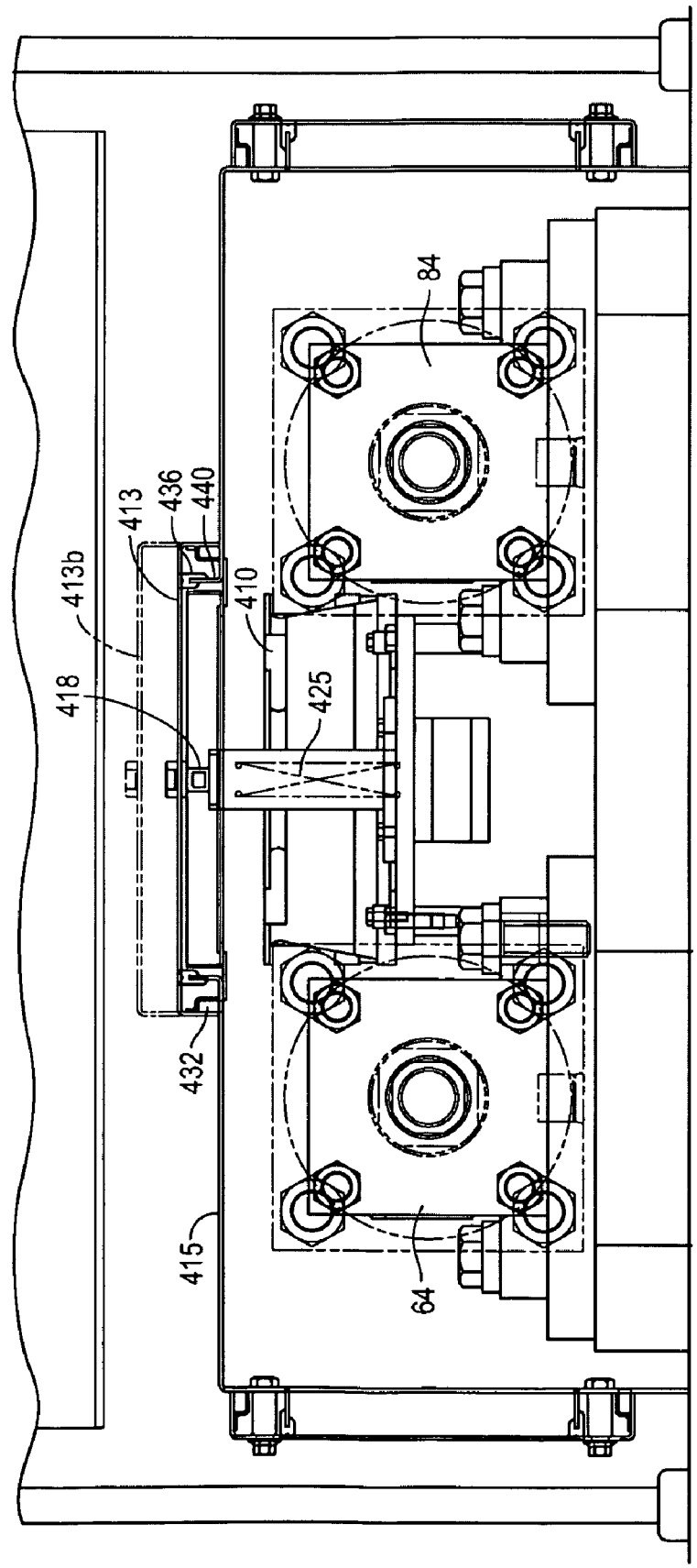
FIG. 4D is an enlarged, fragmentary end view taken as indicated by line 4D-4D in FIG. 1
Figure 4E:
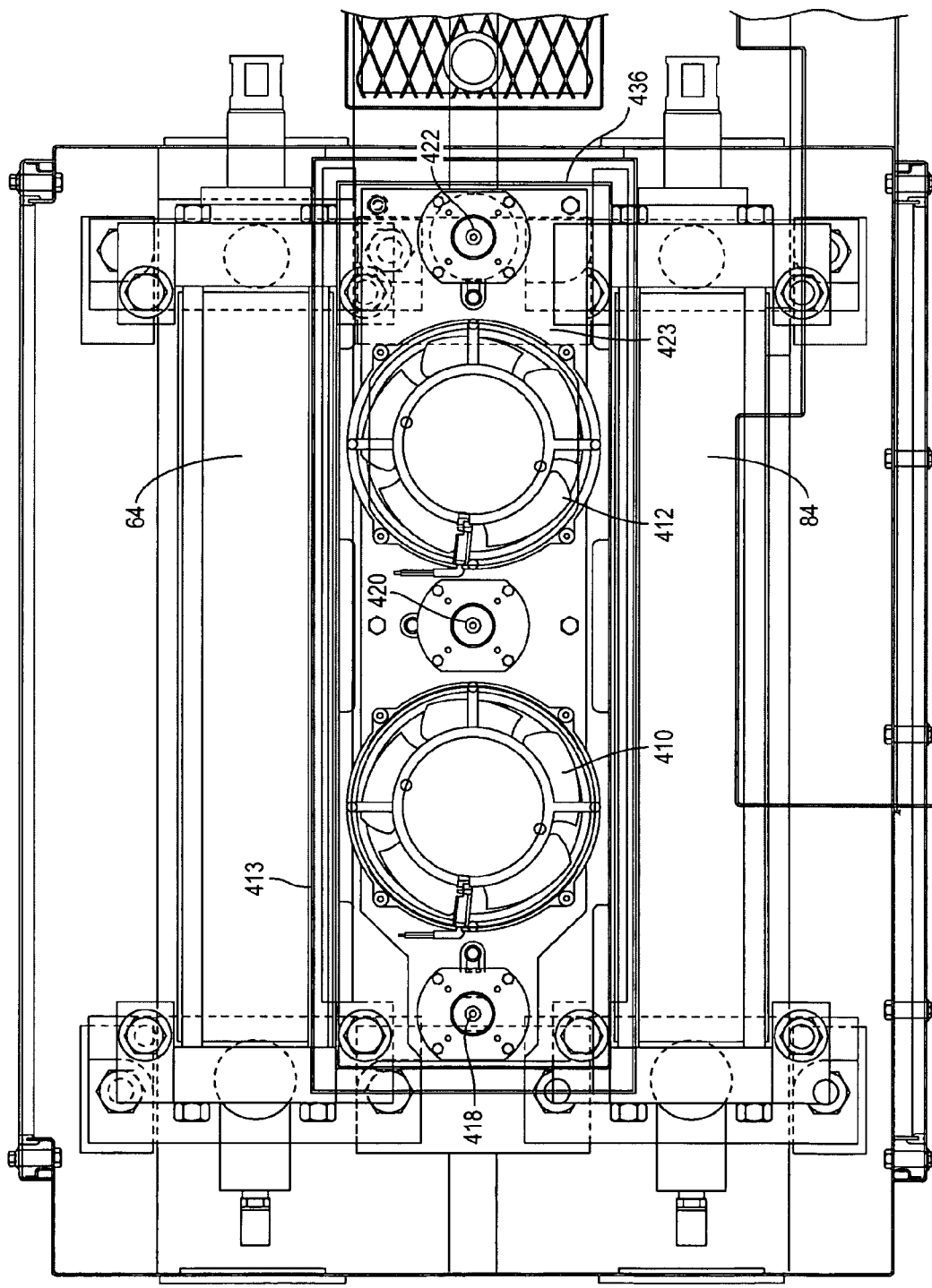
FIG. 4E is an enlarged, fragmentary top view taken as indicated by line 4E-4E in FIG. 4A.

The inlet damper 413 is shown in FIG. 4A and FIG. 4D with a dashed line when in a held open condition 413b and in a solid line when in a closed condition 413. The inlet damper 413 is held open and away from a top of the skin 415 by pneumatic actuators 418, 420, 422. The skin 415 contains the hydraulic cylinders 64, 84. The pneumatic actuators 418, 420, 422 are mounted to the baffle plate 423. An outlet damper 430 is provided in the front of the machine base 21 also held open by pneumatic actuators. The outlet damper 430 is shown in FIG. 1 in an elevated and open condition 430 by a solid line, and lowered and closed condition 430b by a dashed line. The inlet and outlet dampers 413, 430 are configured to spring fail closed if power is turned off or lost to the apparatus 20.

The damper 413 has double seals similar to the door 350. An outer continuous seal element 432 is substantially rectangular in cross-section and seals against the skin 415. It is held in an inside channel 433 fashioned on the damper 413. An inner continuous seal element 436 is mounted on a surrounding flange that defines a rectangular opening 440. The seal element 436 seals against an underside of the inlet damper 413. The sealing of the outlet damper 430 may be arranged similarly or may be a single element seal or pad The actuators and the operation of the dampers 413, 430 are as described in U.S. Pat. No. 7,255,554, herein incorporated by reference. The pneumatic actuators 418, 420, 422 include extendable rods 424 that are fastened attached to the damper 413. The actuators 418, 420, 422 are configured such that when energized with pressurized air the actuators cylinders extend rods 424 to elevate the damper 413 to the position open position, held above the inner and outer continuous seals 436, 432. Outside air can be admitted under the cover and up and over the flange 440 flange that defines a rectangular opening 440 to the inlet of the fans 410, 412 as indicated by the arrows "A." The actuators 418, 420, 422 overcome the compression force of springs 425 within the actuators 418, 420, 422 to elevate the damper 413. If the actuators 418, 420, 422 are de-energized, such as by loss of electrical power to the apparatus 20, an electrical switch cuts pneumatic pressure to the actuators 418, 420, 422 and the springs 425 urge the damper 413 downward onto the seals 436, 432 to close the inlet.

Figure 4F:
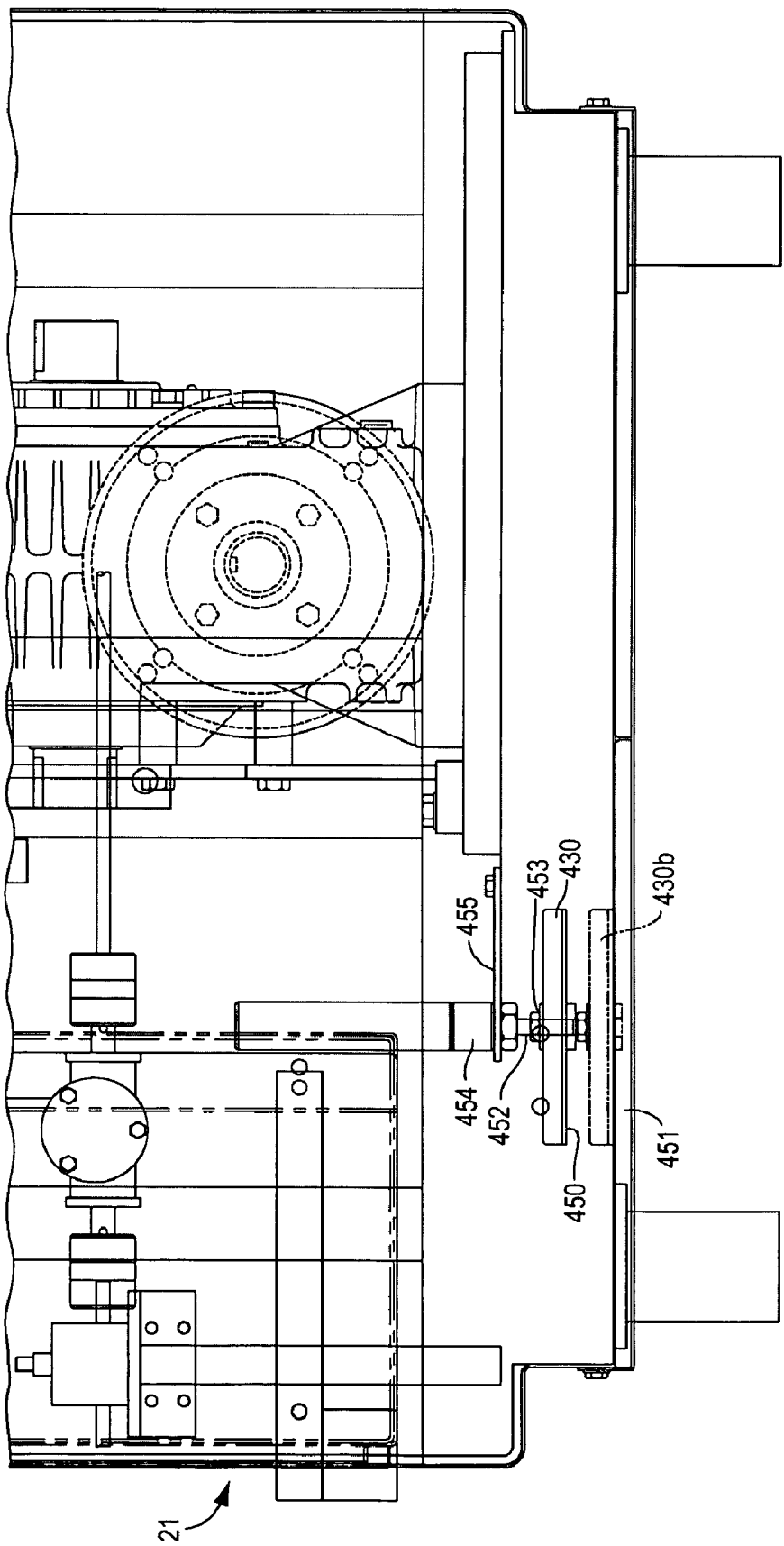
FIG. 4F is an enlarged, fragmentary right end view taken as indicated by line 4F-4F in FIG. 1.

Air passes through the machine and exits the machine base 21 at a front of the machine base 21. As shown in FIG. 4F, an outlet damper 430 is provided having a shut off plate 450. The shut off plate 450 is positioned over an air opening 451 in the base 21. The plate 450 is carried by a rod 452 via self aligning couplings 453 and are raised and lowered by an actuator 454. The actuator is supported by a bracket 455 from the machine base 21 or other stationary structure.

Within actuator 454 are springs (not shown) that are configured to urge the plates 450 downward from the elevated, open position indicated as 430 to the lowered, closed position indicated as 430b. During operation, actuator 454 is energized and pneumatic pressure elevates the plate 450 to the open position 430, overcoming the urging of the springs within the actuator 454.

During machine operation, the actuators 418, 420, 422 are energized, and the dampers 413, 430 are elevated. The fans 412, 410 force air through the machine base 21. If power is interrupted to the apparatus 20, an electrical switch cuts pneumatic pressure to the actuator 454 and the plate 450 is lowered by the springs within the actuator 454 to close the air outlet damper 340.

When the apparatus 20 is washed and sanitized, power is normally shut off. Because power is interrupted, the inlet damper 413 is automatically closed and the air outlet damper 430 is automatically closed. Thus, the base 21 is closed-up and spray water and debris is prevented from entering through the openings closed by the dampers 413, 430.

In one embodiment, as shown in FIG. 4A and FIG. 4D, the cooling fans 410, 412 are located within the base 21 below the conveyor bet 13 and between the hydraulic cylinders 64, 84. The first fan is positioned in longitudinal line with the second fan in relation to said base. The second cooling fan 412 is disposed ahead of first cooling fan 410 within the base 21. The cooling fans 410, 412 are disposed in series in a line that coincides with the conveying direction of the conveyor belt 13.

Improved Electrical Features

Electrical equipment is mounted on a swing-out chassis 650 as shown in FIG. 31. The chassis 650 is hinged by a hinge axle 652 and hinges 653 at one side. The chassis 650 includes door hinge posts 362 on an opposite side to the hinge axle 652, and lugs 664 for attachment of the chassis 650 to the base 21. The door 350 described above connects to the hinge posts 362 by the hinges 351, 352 and fastens to the base 21 around the flange 370.

A 15 inch touchscreen monitor 670 is provided for operator interface to the machine 20. The monitor is 180 degree rotatable about a post 672. The post 672 is inverted L-shaped and is fixed to an underside of the support plate 43 (FIG. 10).

Modular distributed intelligent I/O distribution blocks are used wherein the signal cables 680 from the solenoids 187a, 187b, 201, 202, 232, 233, 217a, 217b, 239a, 239b are connected to a serial block 682 and a single serial cable 686 is then routed to machine control. This configuration reduces manufacturing costs and cable clutter inside the machine. The system is described in FIGS. 13 and 13B.

While the particular preferred and alternative embodiments to the present invention have been disclosed, it will be appreciated that many various modification and extensions of the above described technology may be implemented using the teaching of this invention.

The invention claimed is:

1. A food supply system comprising:
   a hopper;
   a conveyor configured to supply food material to a feed system;
   said conveyor forming the bottom of said hopper;
   the feed system includes a pump feed opening, a first independent sensing element and a second independent sensing element;
   the hopper communicates with a pump feed opening for providing a path toward a molding mechanism;
   the first independent sensing element is configured to indicate the level of moldable food material in a first area of the feed system; and
   the second independent sensing element is configured to indicate level of moldable food material in a second area of the feed system.

2. A food supply system comprising:
   a hopper;
   a conveyor configured to supply food material to a feed system;
   said conveyor forming the bottom of said hopper;
   said feed system for moving food material toward a molding mechanism;
   said feed system comprising a feed screw drive and a modular feed screw bearing assembly for surrounding a feed screw shaft at an intersection with a first horizontal support plate; said feed screw bearing assembly and said feed screw drive are each independently attached to said first support plate; and said feed screw drive independently removable from said support plate;
   the feed screw bearing assembly is vertically orientated and mounted on the first support plate and extends from the first support plate toward a lower horizontal second support plate, the first support plate is spaced apart from the second support plate.

3. The food supply system according to claim 2, wherein said feed system comprises a feed screw connected to said feed screw drive; said feed screw has wall flights having a thickness of at least 0.24 inches.

4. The food supply system according to claim 2, wherein said feed screw drive is mounted to a third horizontal support plate located above feed screw bearing assembly and above the first support plate; the third support plate is connected to the first support plate with a space between said third and first support plates.

5. The food supply system according to claim 2, comprising a feed screw with a feed screw shaft; the feed screw shaft is journaled through the bearing assembly and coupled to an output shaft of the feed screw drive.

6. The food supply system according to claim 5, wherein the feed screw, feed screw drive, and feed screw bearing assembly are vertically aligned.

7. The food supply system according to claim 2, wherein the second support plate comprises a recess and a portion of the bearing assembly opposite the first support plate engages the recess.

8. The food supply system according to claim 1, comprising a machine controller signal connected to the feed screw drive and the first and second sensing elements, the controller having instructions for sending a stop signal to the conveyor when each sensing elements indicate food material is at a predefined level.

9. The food supply system according to claim 1, comprising a machine controller signal connected to the conveyor and the first and second sensing elements, the controller having instructions for sending a signal to the conveyor to cause the conveyor to operate when either the first or the second sensing element indicates food material is below a predefined level.

10. The food supply system according to claim 1, comprising a machine controller signal connected to the conveyor and the first and second sensing elements, the controller is configured to correct an unevenly distributed food material load at the feed screw as based on the signals from the first or the second sensing elements by operating the conveyor until both sensing elements indicate food material is at a predefined level.

11. The food supply system according to claim 1, wherein the feed system comprises a feed screw located above the pump feed opening and adjacent to the first and second sensing elements; the feed screw driven by a feed screw drive axially aligned with the feed screw.

12. The food supply system according to claim 1, wherein the feed system comprises at least three feed screws; the sensing elements are located between the feed screws.

13. The food supply system according to claim 12, wherein the feed screws are located above the pump feed opening; the feed screws are driven by corresponding feed screw drives axially aligned with the corresponding feed screw.

14. The food supply system according to claim 12, wherein the sensing elements extend vertically in the spaces between the feed screws.

15. The food supply system according to claim 2, comprising a plurality of feed screws, and said feed screw bearing assembly comprises a corresponding plurality of modular feed screw bearing assemblies, and said feed screw drive comprises a corresponding plurality of feed screw drives; each feed screw is journaled through one of said bearing assemblies and connected to one of said feed screw drives to form a feed screw drive group;

each feed screw is axially aligned with the corresponding bearing assembly and the corresponding feed screw drive;

the feed screw drive groups are laterally aligned.

16. The food supply system according to claim 1, wherein each of the first and second sensing elements each comprise a sensing rod attached to a pivot shaft, wherein the position of the pivot shaft about its axis of rotation indicates the position of the sensing rod and correspondingly a level of food material within the feed system.

17. Food patty forming apparatus comprising:

a hopper;

a food supply mechanism in the hopper configured to supply food material from the hopper to a feed system;

the feed system includes a pump feed opening, a first independent sensing element and a second independent sensing element;

the hopper in communication with a pump feed opening to provide a path toward a molding mechanism;

the first independent sensing element is configured to indicate the level of moldable food material in a first area of the feed system; and the second independent sensing element is configured to indicate level of moldable food material in a second area of the feed system.

18. The food patty forming apparatus of claim 17, comprising a machine controller signal connected to the food supply mechanism and the first and second sensing elements, the controller configured to stop to the conveyor when each sensing elements indicate food material has exceed a predefined level.

19. The food patty forming apparatus of claim 17, comprising a machine controller signal connected to the food supply mechanism and the first and second sensing elements, the controller configured to signal the operation of the conveyor when either the first or the second sensing element indicates food material is below a predefined level.

20. The food patty forming apparatus of claim 17, comprising a machine controller signal connected to the food supply mechanism and the first and second sensing elements, the controller configured maintain an even distribution of food material in the first and second areas of the feed system by operating the conveyor until both the first and second sensing elements indicate food material is at least at a predefined level.

* * * * *